(12) United States Patent
Bagepalli et al.

(10) Patent No.: US 8,161,167 B2
(45) Date of Patent: Apr. 17, 2012

(54) HIGHLY SCALABLE APPLICATION LAYER SERVICE APPLIANCES

(75) Inventors: Nagaraj Bagepalli, San Jose, CA (US); Prashant Gandhi, San Jose, CA (US); Abhijit Patra, San Jose, CA (US); Kirti Prabhu, San Jose, CA (US); Anant Thakar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 510 days.

(21) Appl. No.: 12/101,868

(22) Filed: Apr. 11, 2008

(65) Prior Publication Data

US 2009/0063625 A1    Mar. 5, 2009

Related U.S. Application Data

(60) Provisional application No. 60/966,649, filed on Aug. 28, 2007.

(51) Int. Cl.
*G06F 15/16* (2006.01)

(52) U.S. Cl. ...................................................... 709/227

(58) Field of Classification Search .......... 709/201–203, 709/213–216, 227–229
See application file for complete search history.

(56) References Cited

U.S. PATENT DOCUMENTS

| | | | |
|---|---|---|---|
| 5,706,429 A * | 1/1998 | Lai et al. | |
| 6,131,120 A * | 10/2000 | Reid | |
| 6,205,480 B1 | 3/2001 | Broadhurst et al. | |
| 6,223,217 B1 * | 4/2001 | Pettus | |
| 6,460,141 B1 | 10/2002 | Olden | |
| 6,594,712 B1 | 7/2003 | Pettey et al. | |
| 6,640,238 B1 * | 10/2003 | Bowman-Amuah | |
| 6,658,469 B1 * | 12/2003 | Massa et al. | 709/224 |
| 6,675,200 B1 | 1/2004 | Cheriton et al. | |
| 6,728,884 B1 | 4/2004 | Lim | |
| 6,754,829 B1 | 6/2004 | Butt et al. | |
| 6,804,720 B1 | 10/2004 | Vilander et al. | |
| 6,889,294 B1 | 5/2005 | Nichols et al. | |
| 6,901,491 B2 | 5/2005 | Kohn et al. | |

(Continued)

FOREIGN PATENT DOCUMENTS

WO    WO 03/104943 A2    12/2003

(Continued)

OTHER PUBLICATIONS

International Search Report and Written Opinion mailed Feb. 2, 2009, for International Application No. PCT/US08/10080, 10 pages.

*Primary Examiner* — Wing Chan
*Assistant Examiner* — Alicia Baturay

(57) ABSTRACT

A highly scalable application layer service appliance is described herein. According to one embodiment, a network element includes a plurality of application service modules (ASMs), each providing one or more application services to network traffic, including layer 5-7 services, a lossless data transport fabric (LDTF), a network service module (NSM) coupled to each of the ASMs over the LDTF. In response to a packet of a network transaction received from a client over for accessing a server of a datacenter, the NSM is configured to perform layer 2-5 processes on the packet, generating a data stream. The NSM is configured to route the data stream to at least two ASMs over the LDTF to allow the ASMs to perform layer 5-7 services on the packet. Other methods and apparatuses are also described.

25 Claims, 16 Drawing Sheets

U.S. PATENT DOCUMENTS

| | | |
|---|---|---|
| 6,912,604 B1 | 6/2005 | Tzeng et al. |
| 6,922,724 B1 | 7/2005 | Freeman et al. |
| 6,947,984 B2 * | 9/2005 | Schweitzer et al. |
| 6,985,956 B2 | 1/2006 | Luke et al. |
| 6,986,040 B1 | 1/2006 | Kramer et al. |
| 6,999,462 B1 | 2/2006 | Acharya |
| 7,010,807 B1 | 3/2006 | Yanovsky |
| 7,051,126 B1 | 5/2006 | Franklin |
| 7,088,727 B1 | 8/2006 | Short et al. |
| 7,100,200 B2 | 8/2006 | Pope et al. |
| 7,114,096 B2 | 9/2006 | Freimuth et al. |
| 7,114,180 B1 | 9/2006 | DeCaprio |
| 7,117,526 B1 | 10/2006 | Short |
| 7,120,792 B1 | 10/2006 | Jacobson et al. |
| 7,146,635 B2 | 12/2006 | Eggebraaten et al. |
| 7,149,808 B2 | 12/2006 | Lu |
| 7,149,817 B2 | 12/2006 | Pettey |
| 7,149,819 B2 | 12/2006 | Pettey |
| 7,149,892 B2 | 12/2006 | Freed et al. |
| 7,162,566 B2 | 1/2007 | Lin |
| 7,171,681 B1 | 1/2007 | Duncan et al. |
| 7,178,163 B2 | 2/2007 | Reeves, Jr. |
| 7,185,192 B1 | 2/2007 | Kahn |
| 7,185,361 B1 | 2/2007 | Ashoff et al. |
| 7,185,364 B2 | 2/2007 | Knouse et al. |
| 7,194,554 B1 | 3/2007 | Short et al. |
| 7,197,556 B1 | 3/2007 | Short et al. |
| 7,209,478 B2 | 4/2007 | Rojas et al. |
| 7,209,970 B1 | 4/2007 | Everson et al. |
| 7,209,977 B2 * | 4/2007 | Acharya et al. ............... 709/240 |
| 7,216,152 B2 | 5/2007 | Short et al. |
| 7,216,225 B2 | 5/2007 | Haviv et al. |
| 7,225,364 B2 | 5/2007 | Carnevale et al. |
| 7,228,412 B2 | 6/2007 | Freed et al. |
| 7,308,101 B2 | 12/2007 | Wing |
| 7,350,229 B1 | 3/2008 | Lander |
| 7,447,220 B2 | 11/2008 | Lu et al. |
| 7,529,845 B2 * | 5/2009 | Liu |
| 7,584,301 B1 | 9/2009 | Joshi |
| 7,630,877 B2 | 12/2009 | Brown et al. |
| 7,633,955 B1 | 12/2009 | Saraiya et al. |
| 7,693,991 B2 | 4/2010 | Greenlee et al. |
| 7,764,678 B2 | 7/2010 | Johnson et al. |
| 7,895,463 B2 | 2/2011 | Bagepalli et al. |
| 2002/0049841 A1 * | 4/2002 | Johnson et al. |
| 2002/0065864 A1 * | 5/2002 | Hartsell et al. |
| 2002/0107971 A1 * | 8/2002 | Bailey et al. |
| 2002/0107989 A1 * | 8/2002 | Johnson et al. |
| 2002/0108059 A1 * | 8/2002 | Canion et al. |
| 2002/0129271 A1 | 9/2002 | Stanaway, Jr. et al. |
| 2002/0199006 A1 | 12/2002 | Magnussen et al. |
| 2003/0005073 A1 * | 1/2003 | Yoshizawa et al. ........... 709/213 |
| 2003/0043794 A1 | 3/2003 | Cayton et al. |
| 2003/0097454 A1 * | 5/2003 | Yamakawa et al. |
| 2003/0097518 A1 | 5/2003 | Kohn et al. |
| 2003/0105830 A1 * | 6/2003 | Pham et al. |
| 2003/0236745 A1 * | 12/2003 | Hartsell et al. .................. 705/40 |
| 2004/0010545 A1 | 1/2004 | Pandya |
| 2004/0010612 A1 | 1/2004 | Pandya |
| 2004/0030757 A1 | 2/2004 | Pandya |
| 2004/0030770 A1 | 2/2004 | Pandya |
| 2004/0030806 A1 | 2/2004 | Pandya |
| 2004/0037299 A1 | 2/2004 | Pandya |
| 2004/0037319 A1 | 2/2004 | Pandya |
| 2004/0107383 A1 | 6/2004 | Bouchier et al. |
| 2004/0128538 A1 | 7/2004 | Gmuender et al. |
| 2004/0139319 A1 | 7/2004 | Favazza et al. |
| 2004/0165588 A1 | 8/2004 | Pandya |
| 2004/0210320 A1 | 10/2004 | Pandya |
| 2004/0213284 A1 * | 10/2004 | Clarke et al. .................. 370/465 |
| 2005/0033880 A1 | 2/2005 | Lin |
| 2005/0060414 A1 * | 3/2005 | Phillips et al. ................. 709/227 |
| 2005/0076166 A1 | 4/2005 | Shearer |
| 2005/0108518 A1 | 5/2005 | Pandya |
| 2005/0147039 A1 | 7/2005 | Biran et al. |
| 2005/0188212 A1 | 8/2005 | Laferriere et al. |
| 2005/0238035 A1 | 10/2005 | Riley |
| 2005/0286513 A1 | 12/2005 | King |
| 2006/0031506 A1 | 2/2006 | Redgate |
| 2006/0045099 A1 | 3/2006 | Chang et al. |
| 2006/0047771 A1 | 3/2006 | Blackmore et al. |
| 2006/0067346 A1 | 3/2006 | Tucker et al. |
| 2006/0069668 A1 | 3/2006 | Braddy et al. |
| 2006/0070131 A1 | 3/2006 | Braddy et al. |
| 2006/0074837 A1 | 4/2006 | Braddy et al. |
| 2006/0075057 A1 | 4/2006 | Gildea et al. |
| 2006/0075114 A1 | 4/2006 | Panasyuk et al. |
| 2006/0075132 A1 * | 4/2006 | Liu ............................... 709/236 |
| 2006/0075463 A1 | 4/2006 | Braddy et al. |
| 2006/0087989 A1 | 4/2006 | Gai et al. |
| 2006/0095334 A1 | 5/2006 | Simmons |
| 2006/0101225 A1 | 5/2006 | Aloni et al. |
| 2006/0123481 A1 | 6/2006 | Bhatnagar et al. |
| 2006/0136570 A1 | 6/2006 | Pandya |
| 2006/0168274 A1 | 7/2006 | Alone et al. |
| 2006/0174104 A1 | 8/2006 | Crichton et al. |
| 2006/0200477 A1 | 9/2006 | Barrenechea |
| 2006/0230119 A1 | 10/2006 | Hausauer et al. |
| 2006/0233101 A1 | 10/2006 | Luft et al. |
| 2006/0236063 A1 | 10/2006 | Hausauer et al. |
| 2006/0236385 A1 | 10/2006 | Innes et al. |
| 2006/0253894 A1 | 11/2006 | Bookman et al. |
| 2006/0259661 A1 | 11/2006 | Feng et al. |
| 2006/0262782 A1 | 11/2006 | Biran et al. |
| 2006/0262796 A1 | 11/2006 | Biran et al. |
| 2006/0262797 A1 | 11/2006 | Biran et al. |
| 2006/0262799 A1 | 11/2006 | Biran et al. |
| 2006/0268866 A1 | 11/2006 | Lok |
| 2006/0291803 A1 | 12/2006 | Watson et al. |
| 2007/0002769 A1 | 1/2007 | Matityahu et al. |
| 2007/0005801 A1 | 1/2007 | Kumar et al. |
| 2007/0067638 A1 | 3/2007 | Haibl et al. |
| 2007/0073966 A1 | 3/2007 | Corbin |
| 2007/0121615 A1 | 5/2007 | Weill et al. |
| 2007/0130167 A1 | 6/2007 | Day et al. |
| 2007/0153798 A1 | 7/2007 | Krstulich |
| 2007/0160072 A1 | 7/2007 | Thalanany et al. |
| 2007/0160073 A1 | 7/2007 | Toumura et al. |
| 2007/0165672 A1 | 7/2007 | Keels et al. |
| 2007/0174429 A1 | 7/2007 | Mazzaferri et al. |
| 2007/0226750 A1 | 9/2007 | Sharp et al. |
| 2009/0063701 A1 * | 3/2009 | Bagepalli et al. ............. 709/238 |

FOREIGN PATENT DOCUMENTS

| | | |
|---|---|---|
| WO | WO 2005/081855 A2 | 9/2005 |
| WO | WO 2005/104443 A2 | 11/2005 |
| WO | WO 2006/031496 A2 | 3/2006 |
| WO | WO 2006/113722 A2 | 10/2006 |

* cited by examiner

HIGHLY SCALABLE APPLICATION LAYER SERVICE APPLIANCES

RELATED APPLICATIONS

This application claims the benefit of U.S. Provisional Patent Application No. 60/966,649, filed Aug. 28, 2007, which is incorporated by reference herein in its entirety.

FIELD OF THE INVENTION

The present invention relates generally to application service appliances. More particularly, this invention relates to highly scalable application layer service appliances.

BACKGROUND

The ability to connect information technology infrastructure reliably, cost-effectively and securely is of high importance for today's global enterprises. To communicate with customers, clients, business partners, employees, etc., the Internet has proven to be more appropriate compared to private communication networks. However, communication via the Internet, which typically uses TCP/IP (Transmission Control Protocol/Internet Protocol), also increases the requirements for data security. Network firewalls are one of the many examples of solutions for network security.

Enterprise Web Application Services build an important foundation for such client, customer, and employee communication. A very common configuration for hosting such enterprise web Application Services is shown in FIG. 1. As shown in FIG. 1, an enterprise can offer web Application Services to various clients and there are several possibilities for clients to connect to the servers depending on the location of the client relative to the servers' location. The servers which provide the Application Services are typically located in the enterprise's data center 1016 and are accessible, directly or indirectly, via World-Wide-Web (WWW) servers 1012. Sometimes enterprises provide access to the Application Services by making the application servers directly accessible by putting those application servers into a Demilitarized Zone (DMZ) 1011.

A client 1003 may connect via a Local Area Network (LAN) through the enterprise's intranet 1013. Another client 1004 may connect through a Wireless LAN (WLAN) to the intranet 1013. Yet another client 1005 may be located inside the enterprise's campus network 1015, which connects to the enterprise's intranet 1013. An enterprise may have zero or more campuses 1014 and 1015. Yet another client 1001 may connect through the Internet 1000, or a client 1002 may have a mobile connection to the Internet 1000. In any case to prevent illegitimate access to the enterprise's web Application Services, the "inside" of the enterprise's network, the intranet 1013, is protected by having a network perimeter 1010, which may comprise firewalls, associated network interconnect, and additional resources "within" the perimeter network configured so as to be broadly accessible to users on the "outside" of the enterprise.

Behind the perimeter 1010, access is granted to legitimate client requests only, while illegitimate access is rejected. The fundamentals in determining whether an access request is legitimate or not are based on the network reference model from the International Organization for Standardization (ISO). This ISO network reference model classifies Network Services into seven layers.

Traditionally, ISO Layer-4 to ISO Layer-7 services have been developed either as server-hardware and -software based single-function (or even multi-function) network appliances or as service modules on ISO Layer-2 to ISO Layer-3 packet switches. The latter approach, though welcomed initially, has not gained momentum in the market place due to the inherent cost and complexity of managing stream-oriented ISO Layer-4 to ISO Layer-7 services in the same product that was originally designed for packet-oriented ISO Layer-2 to ISO Layer-3 switching/routing. In reality, ISO Layer-4 to ISO Layer-7 service modules never became integral parts of the packet switching architecture, because the needs and tradeoffs are quite different. The network appliance approach has been very successful in introducing new innovative functions into the data center, such as Application Front Ends, Application Firewalls, and Wide Area Network (WAN) Optimizations, in a very short period of time, albeit at a lower performance and scalability. However, this approach has also led to the proliferation of multiple single-function network appliances in the enterprise network, particularly for multi-service deployments. Multiple network appliances functioning in the path of a client-server-connection introduce high latency due to multiple transport protocol termination, and involve high management and deployment complexity as the network needs to be carefully designed, taking all failure scenarios into consideration. Customers have begun to experience the negative impact of deploying multiple single-function network appliances and are looking for alternatives. Also, as enterprise data centers migrate to higher bandwidth Ethernet and to converged interconnect fabric, the existing ISO Layer-4 to ISO Layer-7 solutions become ineffective. With this as the background, there is a need for next generation architectures to securely, efficiently and reliably deliver ISO Layer-4 to ISO Layer-7 services.

SUMMARY OF THE DESCRIPTION

A highly scalable application layer service appliance is described herein. According to one embodiment, a network element includes a plurality of application service modules (ASMs), each providing one or more application services to network traffic, including layer 5 to layer 7 services, a lossless data transport fabric (LDTF), a network service module (NSM) coupled to each of the ASMs over the LDTF. In response to a packet of a network transaction received from a client over for accessing a server of a datacenter, the NSM is configured to perform layer 2 to layer 5 processes on the packet, generating a data stream. The NSM is configured to route the data stream to at least two ASMs over the LDTF to allow the ASMs to perform layer 5-7 services on the packet.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

One aspect of the invention is the use of a Lossless Data Transport Fabric for Layer-7 Networking, comprising an ISO Layer-7 networking system, which performs network operations in multiple separate processing domains, which are interconnected via the Lossless Data Transport Fabric (LDTF). This LDTF may be an RDMA-capable fabric, such as InfiniBand or iWARP.

One aspect of the invention is a system and method for Highly-Scalable Layer-7 Networking, comprising an ISO Layer-7 networking system with multiple processing elements connected via a Lossless Data Transport Fabric where the processing necessary to perform the network operation(s) are distributed over the processing elements. In some configurations, at least one of the processing elements is dedicated to operations for ISO Layer-7 processing. In some configurations, at least one of the processing elements is dedicated to operations for ISO Layer-2 to ISO Layer-5 processing.

OVERVIEW

Figure 2:
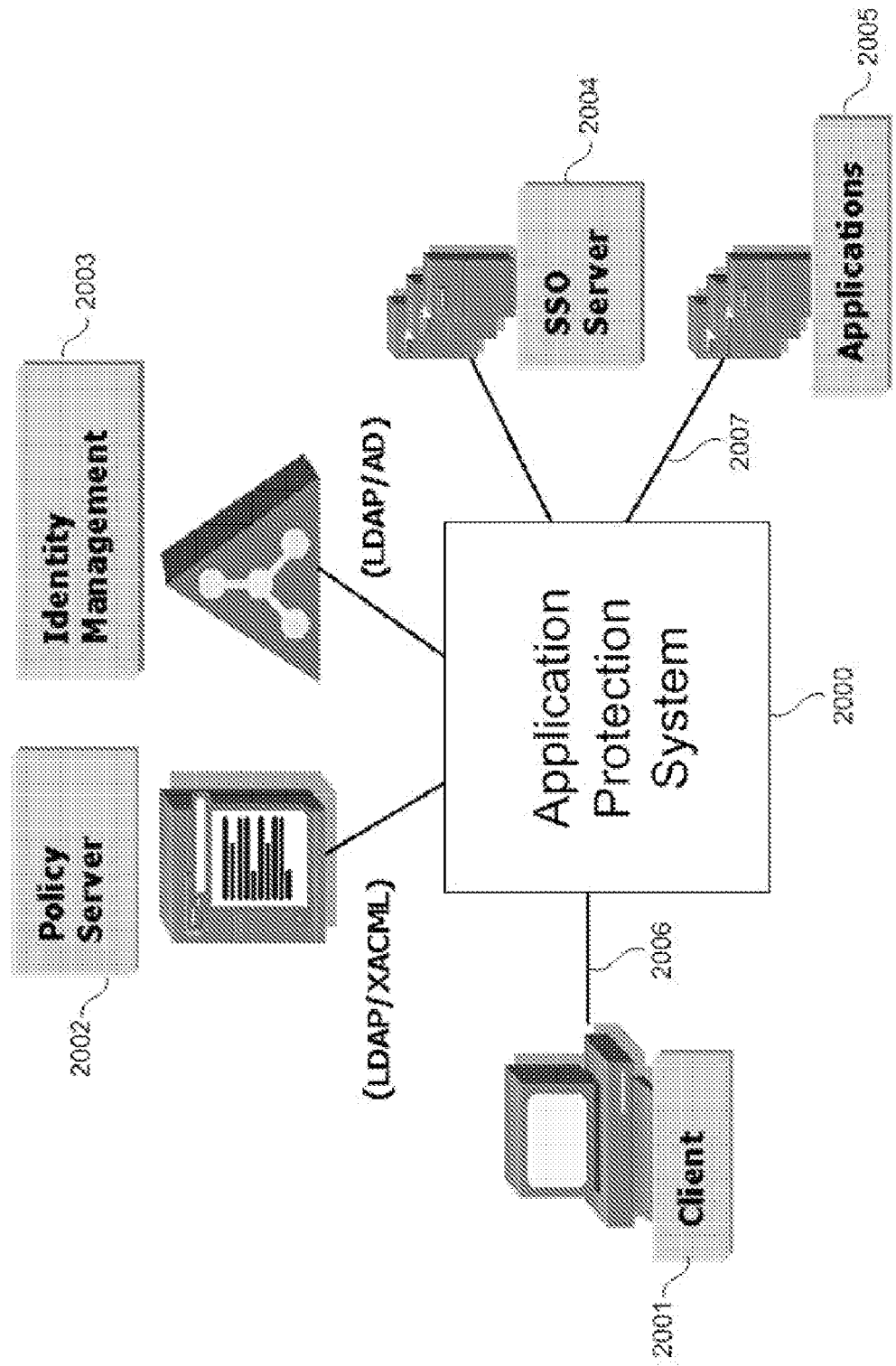
FIG. 2 illustrates the application of an application network appliance (ANA) as the APS according to one embodiment of the invention.

The approach described herein applies combinations of parallel, multi-processor computing technology with lossless, low-latency, high-bandwidth network fabric technology (also known as Lossless Data Transport Fabric, or LDTF) to form novel methods and systems for high performance, high-reliability, high availability, and secure network applications. The various embodiments of the inventions described herein enable the implementation of highly reliable, highly scalable solutions for enterprise networking such as, for example, the APS 2000 from FIG. 2.

Multiple network Services are efficiently provided by terminating transport protocols centrally. As can be seen, any transport protocol can be terminated centrally, each PDU's payload can be collected and converted into a data stream and, vice versa, a data stream can be converted into PDUs for any transport protocol and be transported via the given transport protocol. A simple concatenation of the PDU payload into a byte-stream is not sufficient. Key to the conversion is that state information must be maintained about the meta-data of each connection. Such meta-data includes the session information, for example via a unique connection identification number, the transaction information, as well as the information regarding segments and packets. Finite state machines can be used to track the meta-data.

Transport protocols are protocols which are used to transport information via networks. These include, obviously, the ISO Layer-3 protocols such as IPv4, IPv6, IPSec, the ISO Layer-4 protocols such as TCP, UDP, SCTP, the various ISO Layer-5 protocols such as FTP, HTTP, IMAP, SMTP, GTP, L2TP, PPTP, SOAP, SDP, RTSP, RTP, RTCP, RPC, SSH, TLS, DTLS, SSL, IPSec, and VPN protocols. However, other protocols and approaches are contemplated within the scope of the inventions, which serve as transport mechanisms for transmitting information and application data and can also be terminated in a centralized fashion by a protocol proxy and the corresponding PDUs can be transformed into a data stream for application layer processing. Examples of such are, CSIv2, CORBA, IIOP, DCOM and other Object Request Brokers (ORB), MPEG-TS or RTP as a transport for multi-media information, RTSP or SIP as another transport for multi-media information, peer-to-peer transport mechanisms, transport mechanisms based on J2EE such as Java RMI, streaming media protocols such as VoIP, IPTV, etc.

For the sake of simplicity we will use the term Centralized Transport Protocol Termination throughout the rest of the description, however, this is for exemplary purposes only and is not intended to be limiting. Centralized Transport Protocol Termination can be performed by dedicated processing units, and different ISO Layer-7 services can be performed in other dedicated processing units. The use of a lossless low-latency high-bandwidth fabric for inter-process communication between such dedicated processing units makes it possible to simultaneously support Centralized Transport Protocol Termination for multiple services. For example, TCP can be terminated once, transformed into a data stream and this data stream is transported from one dedicated processing unit to another using the lossless low-latency high-bandwidth fabric. The low-latency nature of the fabric helps to reduce the overall latency in client-to-server transactions.

Figure 1:
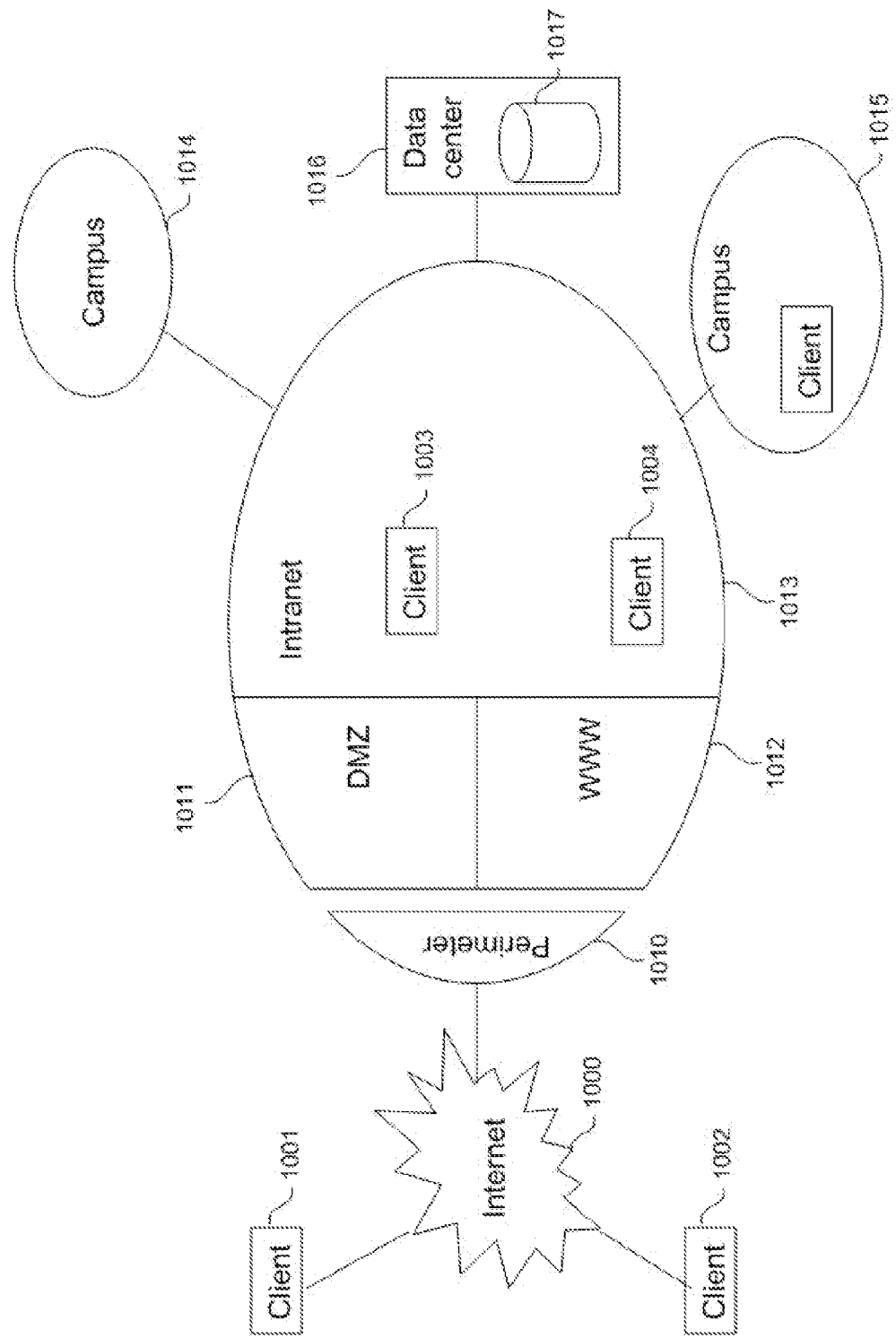
FIG. 1 illustrates a typical corporate computer network connected to the Internet.

In one embodiment, the Application Protection System (APS) 2000 is a network appliance that can act as a proxy between the client 2001 and the application server 2005, and can determine whether a client 2001 shall be granted access to certain applications 2005. In one example, the client 2001 is one or more of the clients 1001, 1002, 1003, 1004, or 1005 of FIG. 1. In another example, the client 2001 can be a virtual machine or a cluster of computers, or a server (for server-to-server connections, for example). The application server 2005 can be, for example, without limitation, one or more file servers, one or more web servers, one or more database servers, one or more compute servers, one or more storage servers or one or more game servers. The decision whether access is granted or rejected involves an Identity Management Server 2003 to identify the user, client, or application, for example using Lightweight Directory Access Protocol (LDAP) or Active Directory (AD), and is the result of querying a Policy Server 2002 to analyze the access policy for the requested application 2005.

The APS 2000 may use a Triangulated Authorization method which, for example, is based on multiple aspects of a client (such as the client 2001), the requested application (such as application 2005) and certain network characteristics: Who—a client (a user or a machine) and its associated attributes such as department, role, project association, seniority, citizenship, etc; Where—network and environment attributes such as access methods (wire-line/wireless/VPN), location (e.g., USA, Switzerland, China) and time; What—on-the-wire session attributes, including protocol and content/resource attributes. The outcome of this Triangulated Authorization method can be used to determine whether access to an application is granted or rejected. Optionally, a Single-Sign-On (SSO) server such as server 2004 may be involved that allows the client 2001 to obtain authorization for accessing multiple applications at once.

Centralized Transport Protocol Termination for Multi-Services

One embodiment of the invention acts as a proxy between one or more clients and one or more application servers to control the access of the one or more clients to the one or more applications. This is described, for example, in FIG. 2, where the APS 2000 controls access of client 2001 to application server 2005. Thereby the approach can act as a high-speed, full proxy which terminates both client-side and server-side transport protocol connections, and which behaves as a virtual server to the one or more clients, and as a virtual client to the one or more servers. The proxy function is required because of the need to reassemble PDUs into data streams and (where needed) to decrypt the payload data for inspection such as access control. The proxy function involves ISO Layer-2 to ISO Layer-5 processing such as Centralized Transport Protocol Termination.

One embodiment of the invention is a network appliance which terminates multiple transport protocols in one central point to overcome the many drawbacks of multiple transport protocol termination, such as increased latency and lack of scalability. Therefore, the network appliance may need to perform a set of functions similar to those typical of application servers such as network proxy, deep packet inspection, cryptography, data compression, regular expression parsing, etc. Network services that may need Centralized Transport Protocol Termination include but are not limited to application authentication and authorization, application firewalls, application data routing, in-line intrusion-detection and intrusion prevention, SSL offloading/acceleration, server load balancing, XML offloading/acceleration, and application front-end engine services (also called application acceleration).

ISO Layer-2 to ISO Layer-5 processing typically involves packets, segments and records processing, whereas ISO Layer-7 processing typically involves application data processing. Full ISO Layer-7 inspection goes beyond application headers and typically involves reassembling application layer data. A general rule used in the art is that a 1 GHz processor is needed for processing ISO Layer-3 or ISO Layer-4 PDUs at 1 Gbps, whereas a 10 GHz processor is needed for application data processing at 1 Gbps (for example for SSL VPN URL mangling operation). Therefore, the computational complexity required for scaling the proxy functionality is quite different from the computational complexity required for scaling ISO Layer-7 processing.

To solve the computational complexity in an efficient way, one embodiment of the invention splits the overall ISO Layer-2 to ISO Layer-7 stack into (at least) two independent processing domains. One domain, which is called Network Service processing for ISO Layer-2 to ISO Layer-5 processing (i.e., up to TCP/SSL processing) provides proxy functions, and a second domain which is called Application Service processing for ISO Layer-7 processing. Splitting the stack requires a reliable, lossless, low-latency, high-bandwidth connection between those two (or more) processing domains in order for the Network Service processing to forward the data stream to the Application Service processing for further processing. As a solution, this approach uses a LDTF such as RDMA-capable fabric technology to provide this reliable lossless, low-latency, high-bandwidth interconnect between processing domains.

Figure 3:
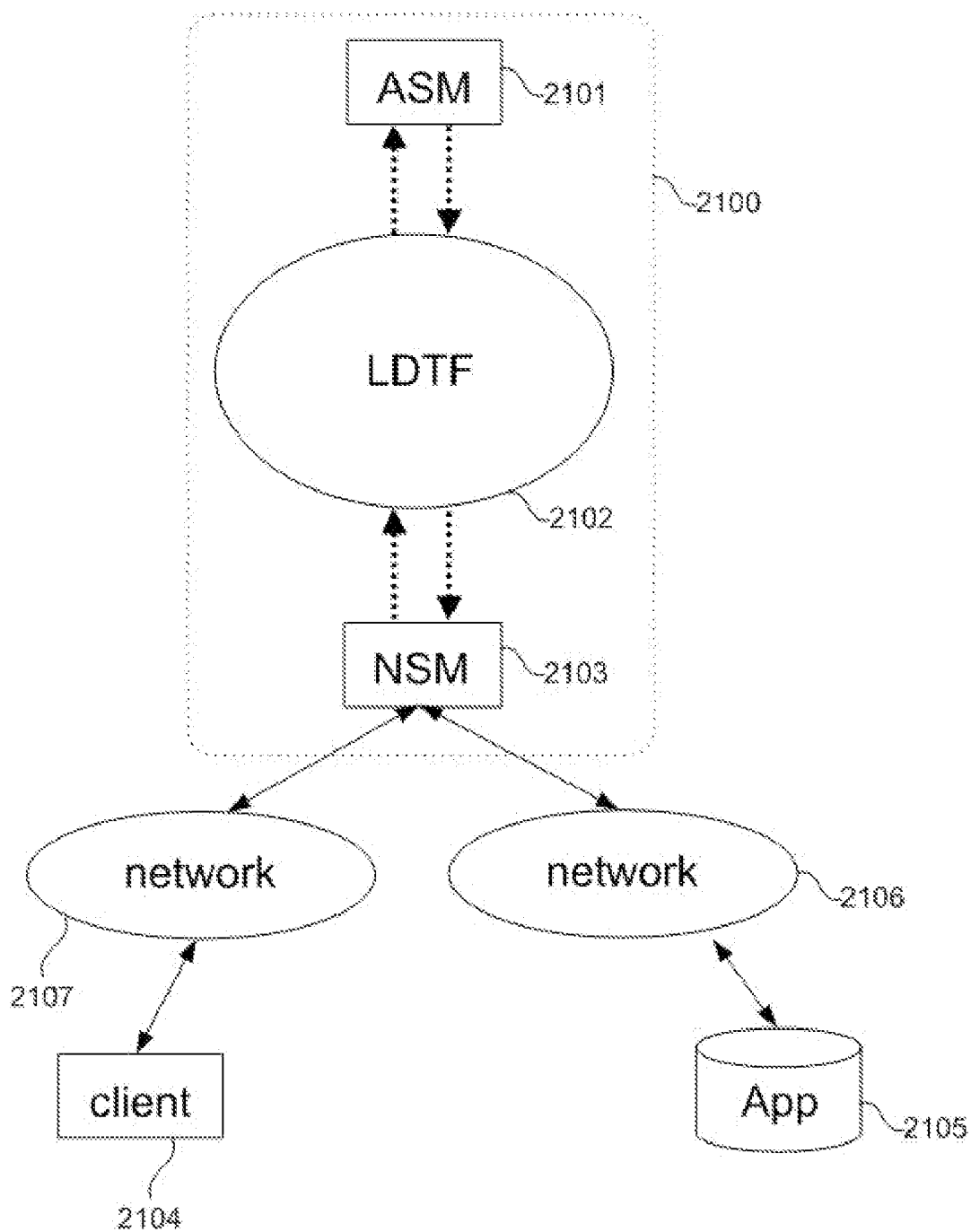
FIG. 3 is a network connected block diagram of an ANA according to one embodiment of the invention.

FIG. 3 is a block diagram illustrating an example of application service appliance system according to one embodiment of the invention. Referring to FIG. 3, ANA 2100 acts as a proxy between a client 2104 and an application server 2105. The client 2104 is connected to the ANA 2100 via a network 2107. Network 2107 can, for example, be a LAN, a WAN, a WLAN, an intranet, or the Internet. The application server 2105 is connected to the ANA 2100 via network 2106. Network 2106 can, for example, be a LAN, a WAN, a WLAN, an intranet, or the Internet. Networks 2106-2107 may be the same network or different networks. While it is apparent that multiple clients and multiple application servers may be connected to the ANA 2100, for the sake of simplicity a single client, single application server case is used as a placeholder throughout. Incoming connections, for example, a request from the client 2104 is terminated in the NSM 2103 and is transformed into a data stream. This is done by PDU processing and reassembling the payload of the PDU into a data stream of ISO Layer-7 application data. This data stream is transported via LDTF 2102 to the ASM 2101 for further ISO Layer-7 processing. LDTF 2102 may be an RDMA or IB compatible fabric. The result of ISO Layer-7 processing done by ASM 2101 is then transported back—still as a data stream—via the LDTF 2102 to the NSM 2103. The NSM 2103 then transforms the data stream into PDUs and sends the PDUs to the application server 2105 via the appropriate transport protocol. Connections which originate from the application server 2105 can be handled similarly.

Using this novel approach, both processing domains can be scaled independent of each other and a well-balanced system can be achieved at reasonable costs.

A LDTF, such as the LDTF 2102 can be used for the inter-process communication between those domains. In one embodiment of the invention, the LDTF is implemented using the IB point-to-point switch fabric architecture. Incoming connections from the client are terminated in the NSM and are transformed into a data stream. This data stream can, for example, without limitation, be transported via the IB fabric. In one other embodiment of the invention, the LDTF is implemented using an RDMA-capable interconnect fabric. In further embodiments of the invention, it is contemplated that other LDTFs may be used as interconnect fabrics, for example, without limitation, iWARP and other interconnect fabrics such as are known or may become known to one of ordinary skill in the art.

This can be done by PDU processing and reassembling the payload of the PDUs into their corresponding data stream. This data stream is transported via IB fabric to the ASM for further ISO Layer-7 processing. The result of ISO Layer-7 processing done by ASM is then transported back—still as a data stream—again via the IB fabric to the NSM. The NSM then transforms the data stream into PDUs and sends the PDUs to the application server using the appropriate transport protocol. Connections which originate from the application server can be handled similarly.

One benefit of the present approach is the overall reduction of latency in the communication link between clients and application servers. Yet another benefit is that the approach can be scaled with various, specialized, dedicated processing modules.

Highly Scalable Architecture for Application-Layer Service Using LDTF

One key aspect of the invention described herein is the approach to keep the communication in separate planes: For example, a Network Service plane, an Application Service plane and a Management Service plane. The fact that the Network Service plane is separate from the Application Service plane is also reflected by splitting the network protocol processing into two or more domains, for example into Network Service processing and Application Service processing. This offers additional options for optimizing the performance of this approach and to make it scale better to networking and availability demands.

One option is that at the Network Service plane a processing unit for packet order work processing can be deployed. Then the packets of a particular connection can be handled by any processing element of a multi-processing architecture without the need for software locks. The packets can then be processed in multiple stages, which provide a higher degree of concurrency. Similarly, at the Application Service plane a processing unit for transaction order work processing can be deployed and, for example, implemented in software. Then the transactions of a particular connection can be handled by any processing element of a multi-processing architecture without the need for software locks. Therefore, each transaction can then be processed in a pipelined fashion which serializes the application data processing and increases the level of concurrency for ISO Layer-7 processing, which again further increases the compute efficiency of this approach.

Figure 4:
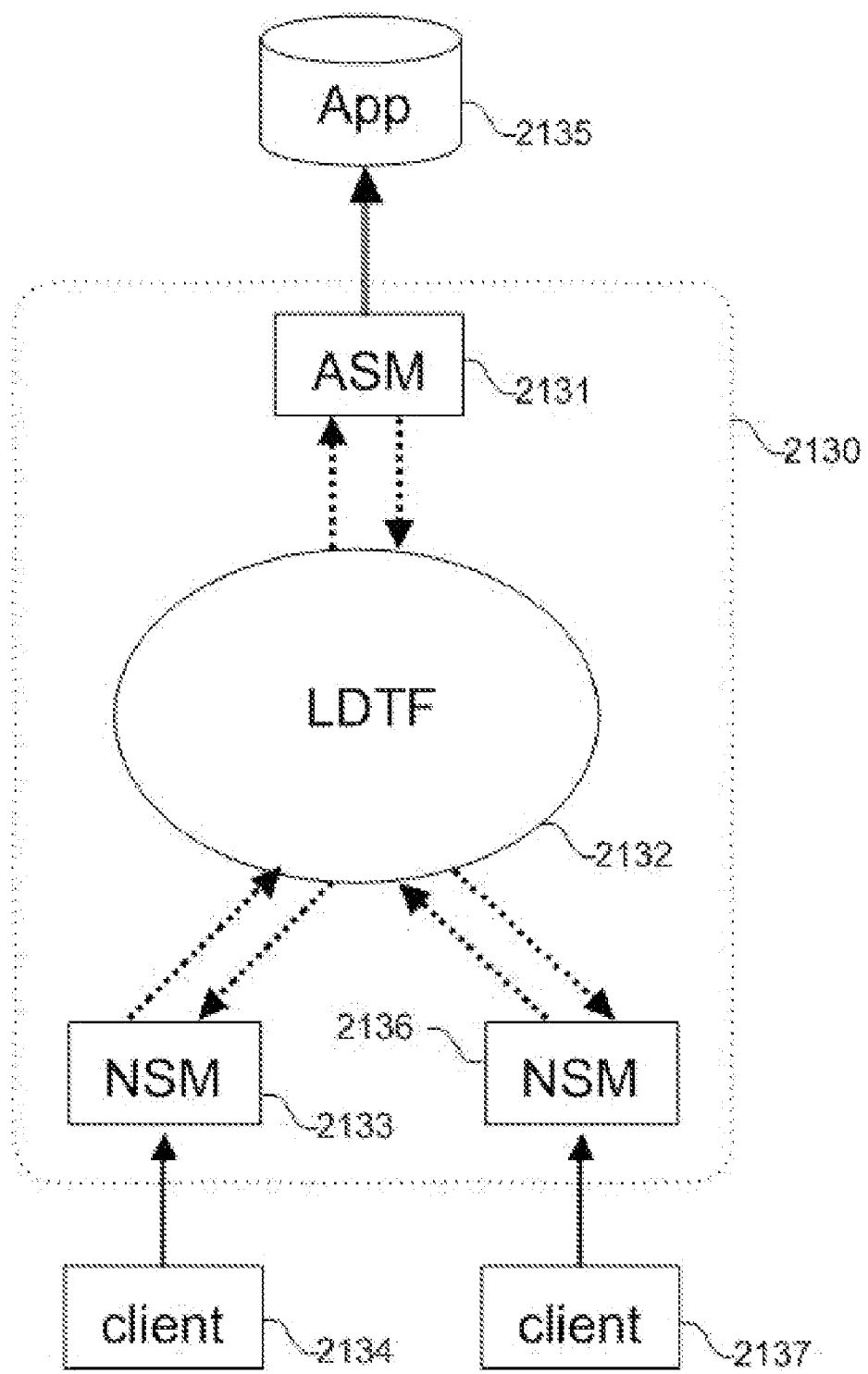
FIG. 4 is a block diagram which illustrates scalability of an ANA according to one embodiment of the invention.

At the Network Service plane various possibilities for network flow control schemes now become possible. FIG. 4 shows how two NSMs can be used to scale the ANA 2130 for an increased bandwidth demand. The NSM 2133 and the NSM 2136 each service client 2134 and client 2137 respectively therefore providing load balancing options. Both NSM 2133 and NSM 2136 reassemble the PDUs to transform the PDU payload into a data stream. Both NSMs are connected to LDTF 2132 to forward the data stream to ASM 2131 for ISO Layer-7 processing before it gets sent to the application server 2135. One advantage of balancing the transport protocol traffic over two—or more—NSMs is to reduce latency in a client-to-server connection, for example, when compute-intensive SSL termination is done by a NSM. While FIG. 4 illustrates the case of dedicated NSMs (one for client 2134 and another NSM for client 2137—somewhat reflecting the case of a segmented network) all the two—or more—NSMs could be connected to all clients as well.

Figure 5:
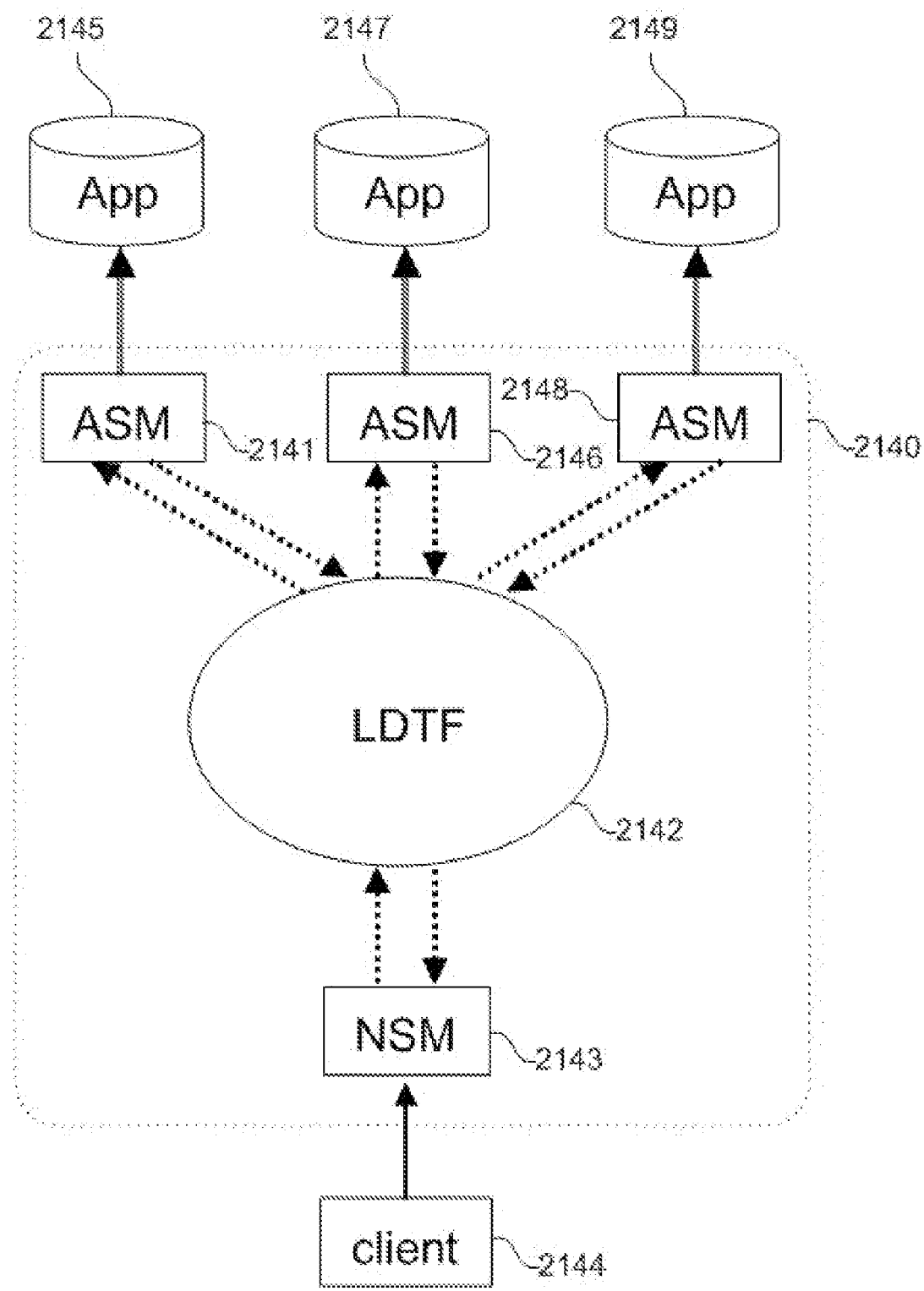
FIG. 5 is a block diagram which illustrates scalability of an ANA according to another embodiment of the invention.

In a practical enterprise network application another performance optimization is important. Typically, one NSM can keep several ASMs busy. Therefore it makes sense not only to load balance traffic in the Network Service plane but also in the Application Service plane. Various possibilities for such optimizations exist as disclosed herein. In one embodiment of the invention, the ANA 2140 of FIG. 5 uses one NSM 2143 for communication with client 2144 and that NSM 2143 forwards the transformed data stream via LDTF 2142 to two or more "parallel" ASMs. In this example, three ASMs 2141, 2146, and 2148 are available, each dedicated to one application server, namely 2145, 2147, and 2149. Load balancing among the two or more ASMs can be done by the NSM and can, for example, depend on which application server provides the Application Service requested by the client.

Figure 6:
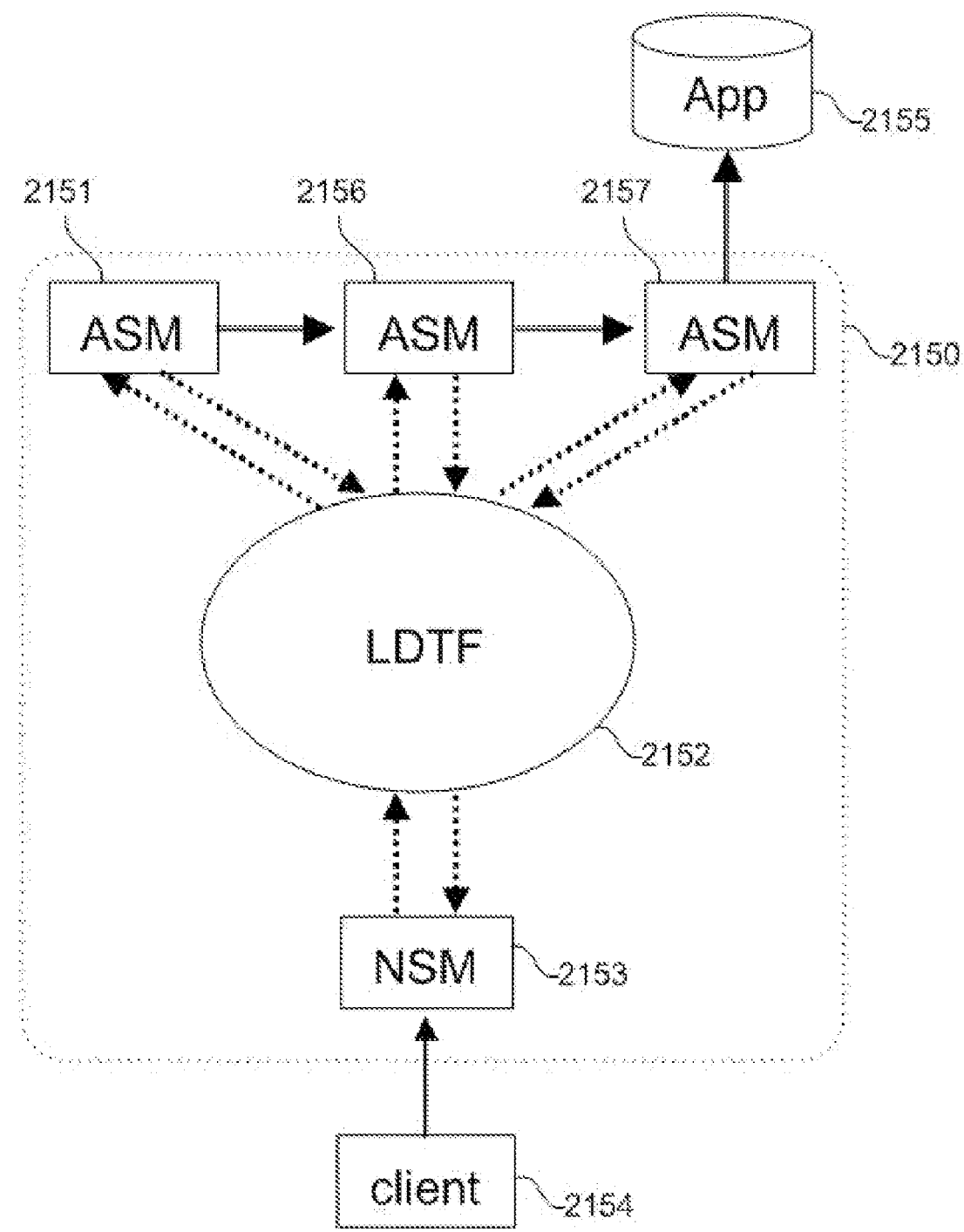
FIG. 6 is a block diagram which illustrates scalability of an ANA according to another embodiment of the invention.

FIG. 6 illustrates another option for scaling by load balancing in the Application Service plane. In another embodiment of the invention, the ANA 2150 uses one NSM 2153 for communication with client 2154 and that NSM 2153 forwards the transformed data stream via LDTF 2152 to two or more ASMs. In this example, three "pipelined" ASMs 2151, 2156, and 2157 are performing ISO Layer-7 processing in a pipelined manner: The ASM 2151 preprocesses the data stream and hands it over to ASM 2156 which performs additional ISO Layer-7 processing before it further hands the data stream over to ASM 2157 which does final ISO Layer-7 processing before the data is handed over to the application server 2155. Pipelined execution may also be done using out-of-order execution. Of course, all ASMs are connected to the LDTF 2152 which is used for efficient inter-process communication between the various ASMs. Thus, in this example, the ASMs build a logical processing chain: NSM 2153 only forwards the data stream to ASM 2151, and ASM 2157 only forwards the data to the application server 2155 via the converged data center fabric.

Figure 7:
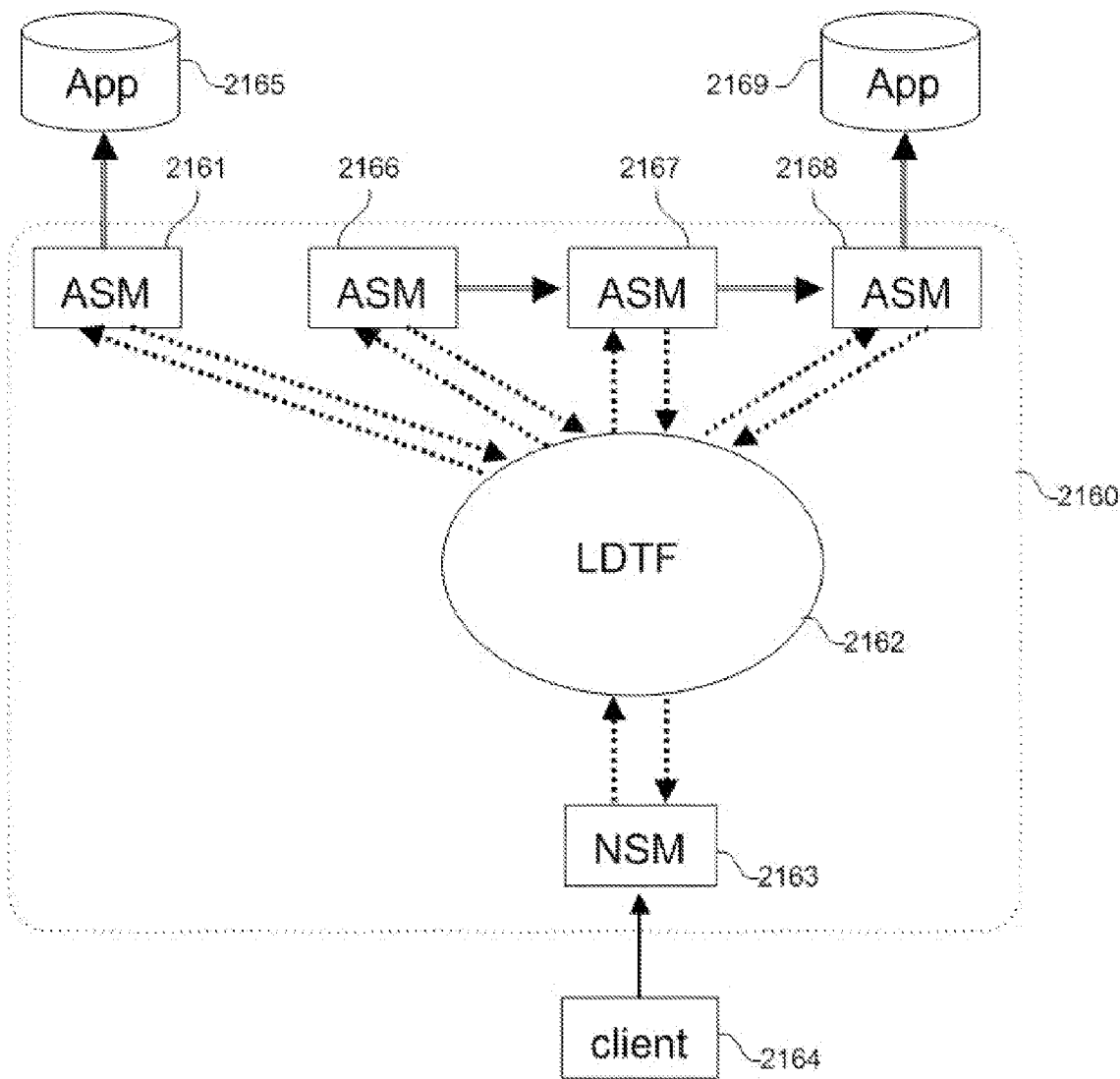
FIG. 7 is a block diagram which illustrates scalability of an ANA according to yet another embodiment of the invention.

Many combinations of scaling by connecting one or more NSMs and one or more ASMs are possible, all interconnected via lossless, low-latency, high-bandwidth LDTF. For example, in yet another embodiment of the invention which is illustrated in FIG. 7, a hybrid combination of "parallel" and "pipelined" ASMs is shown: The ANA 2160 uses one NSM 2163 for communication with client 2164 and that NSM 2163 forwards the transformed data stream via LDTF 2162 to two or more ASMs. One ASM 2161 performs dedicated ISO Layer-7 processing for application server 2165. Parallel to ASM 2161 three other ASMs 2166, 2167, and 2168 are pipelined to perform ISO Layer-7 processing for application server 2169.

The third plane, the Management Service plane, is a communication means for all administrative processing such as, for example, common system management functions, chassis management, power management, component audit and logging, component and system status update, as well as configuration, health monitoring and management of processing elements in network services and Application Service plane. The Management Service plane comprises System Control Modules (SCMs) which can have out-of-band connectivity (as well as in-band connectivity) to processing elements on the Network Service plane and to processing elements on the Application Service plane. Typically, software image download, configuration information, and statistics collection messages are exchanged between one or more SCMs and the rest of the system components.

Figure 8:
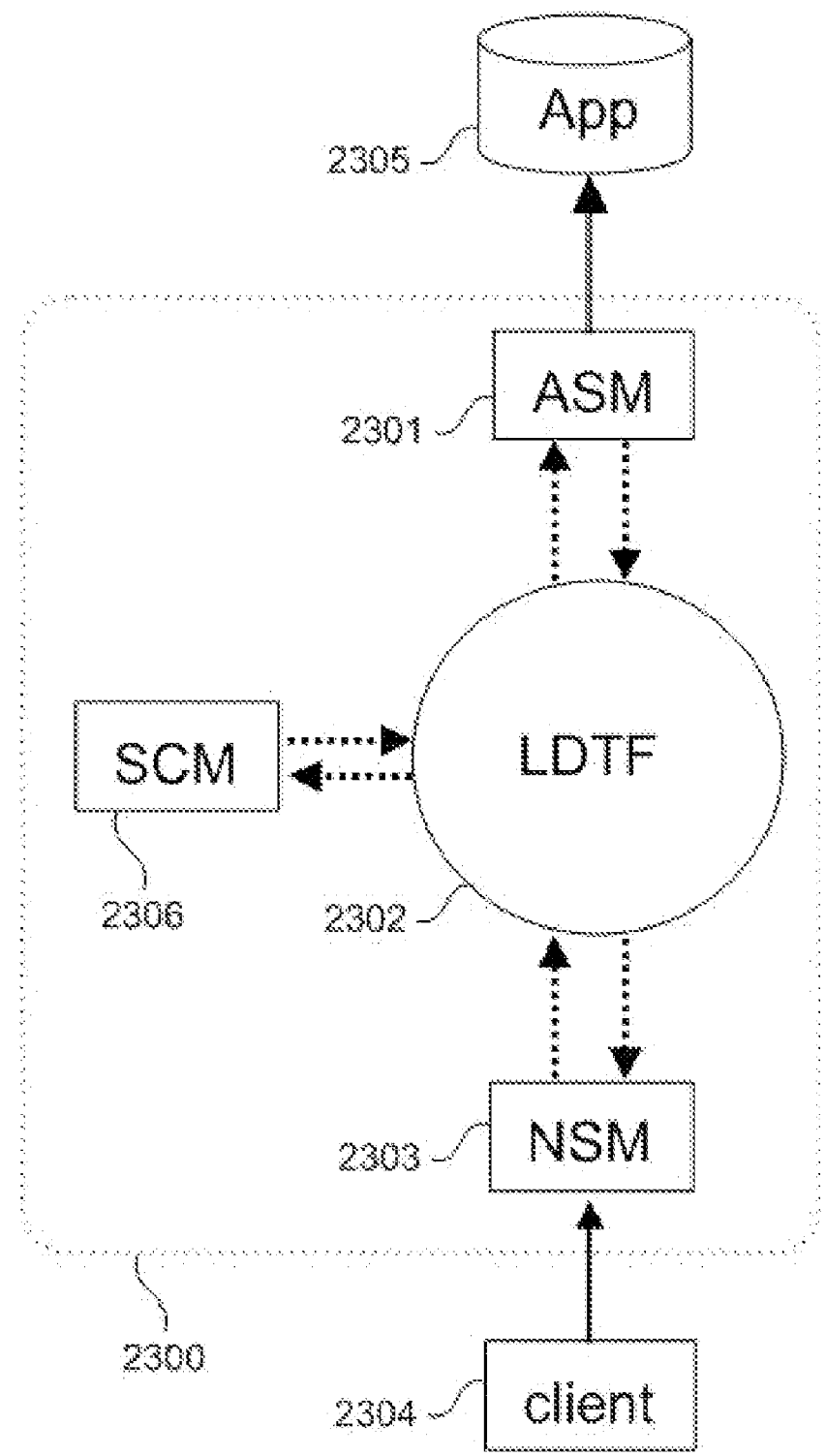
FIG. 8 is a block diagram of an ANA with a System Control Module (SCM) according to one embodiment of the invention.

FIG. 8 illustrates how SCMs can be connected to the other components. The ANA 2300, which can, for example, be the ANA 2100 of FIG. 2, behaves as a proxy for client-to-server connections and can be connected, for example, to a client 2304 and an application server 2305. The ANA 2300 can have one or more NSMs, such as NSM 2303, connected via LDTF 2302 to one or more ASMs 2301 for network processing. Also connected to the LDTF 2302 is a SCM 2306 which performs the administrative tasks. In one embodiment of the invention, IB is used as the LDTF, which can support virtual lanes and a dedicated virtual lane may be reserved just for system management communication involving the SCM.

Figure 9:
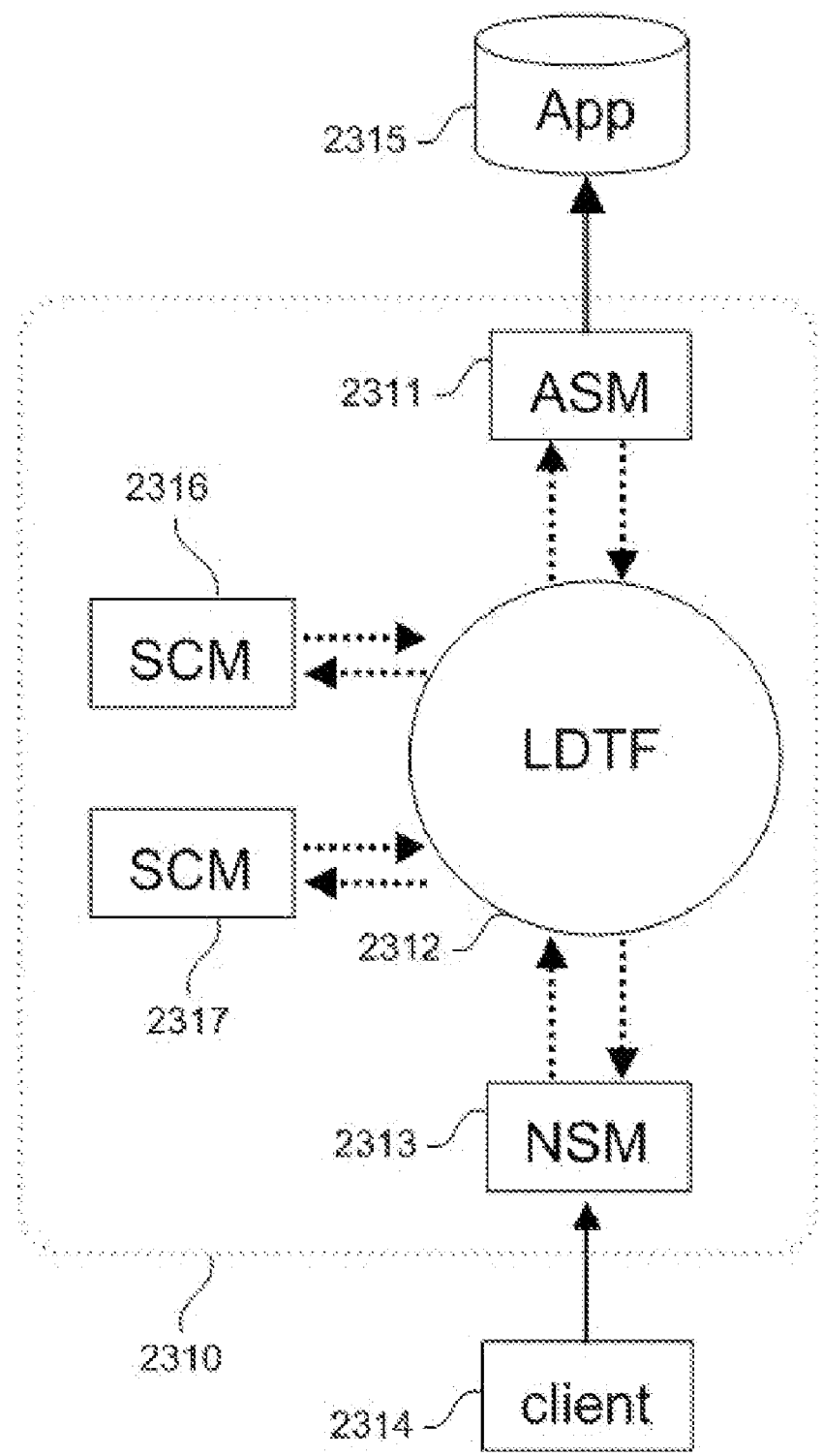
FIG. 9 is a block diagram of an ANA with two or more SCMs according to another embodiment of the invention.

For performance scaling purposes and to support high-availability, two or more SCMs can be connected to the LDTF. For example, in one embodiment of the invention, which is illustrated in FIG. 9, an ANA 2310, which behaves as a proxy for client-to-server connections and connected for network processing, for example, to a client 2314 and an application server 2315. The ANA 2310 can have one or more NSMs, such as NSM 2313, connected via LDTF 2312 to one or more ASMs, such as ASM 2311. The ANA 2310 can also have two—or more—SCMs, such as SCM 2316 and SCM 2317, also connected to LDTF 2312.

In yet another embodiment of the invention, two—or more—ANAs can be connected via a high-availability link using LDTF. The high-availability link can be an external extension of the internal LDTFs. Each ANA can then operate as a backup ANA for one of its peers as it is described above. Similarly to NSMs and ASMs, the two—or more—SCMs can replicate their state information and update their state information in their backup ANA's SCM by writing state information into the peer's memory via the LDTF using, for example, RDMA.

L2-L5 Processing Unit—NSM

Figure 10:
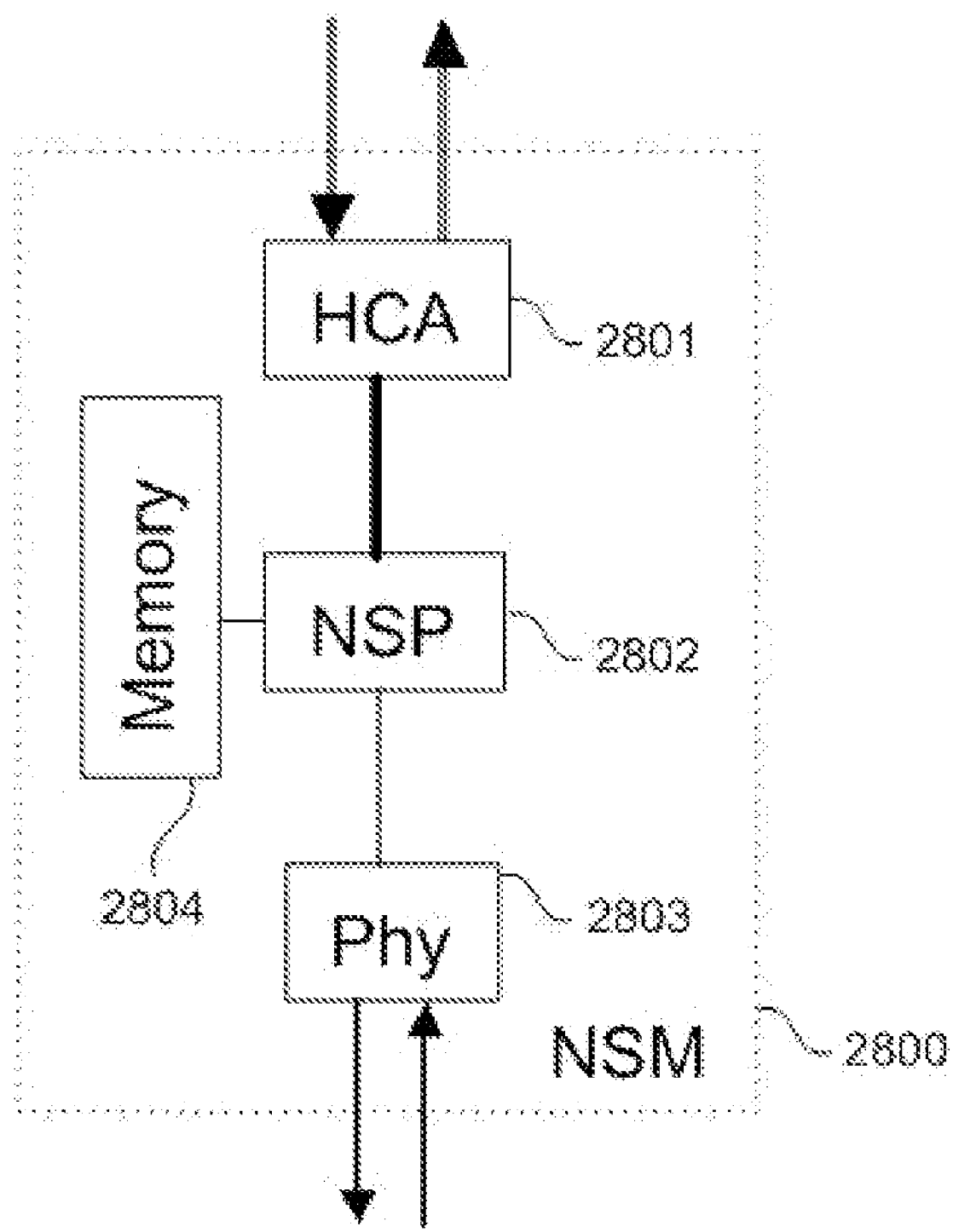
FIG. 10 is a block diagram of a Network Service Module (NSM) of an ANA according to one embodiment of the invention.

A NSM processes the lower network layers, ISO Layer-2 to ISO Layer-5. In one embodiment of the invention, such a NSM can be constructed as shown in FIG. 10. The NSM 2800 comprises a host channel adapter (HCA) 2801, a network services processor (NSP) 2802, and physical network layer receiver (Phy) 2803 and memory 2804. The host channel adapter 2801 connects to the LDTF, which can be IB fabric. The physical network layer receiver 2803 connects to Ethernet. The NSP 2803 runs programs stored in memory 2804 to perform ISO Layer-2 to ISO Layer-5 processing, such as Centralized Transport Protocol Termination, PDU reassembly to transform the PDU payload into a data stream, cryptographic processing, etc.

Figure 11:
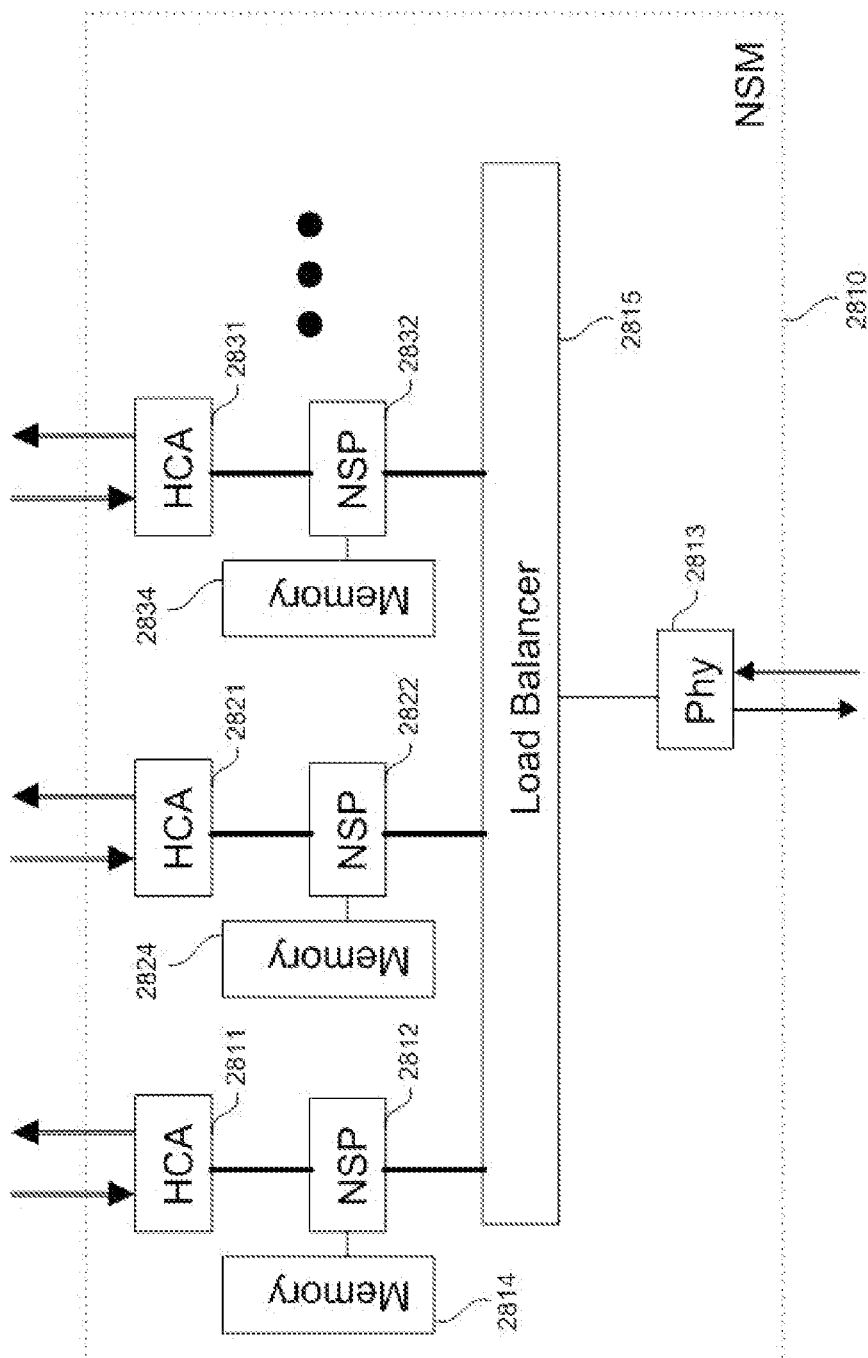
FIG. 11 is a block diagram of a NSM of an ANA according to another embodiment of the invention.

For better scalability, in one embodiment of the invention, a NSM can be a multi-processor architecture, as shown in FIG. 11. Here the NSM 2810 can comprise two—or more—NSPs, such as NSP 2812, NSP 2822, NSP 2832, each having a dedicated host channel adapter, such as host channel adapter 2811, host channel adapter 2821, and host channel adapter 2831, and dedicated memory, such as memory 2814, memory 2824, and memory 2834. A load balancer 2815 is in between the NSPs and the physical network layer receiver 2813 and balances the network load between the two—or more—NSPs. The load balancer 2815 can use common approaches known in the art to balance ingress or egress network traffic.

L7 Processing Unit—ASM

Figure 12:
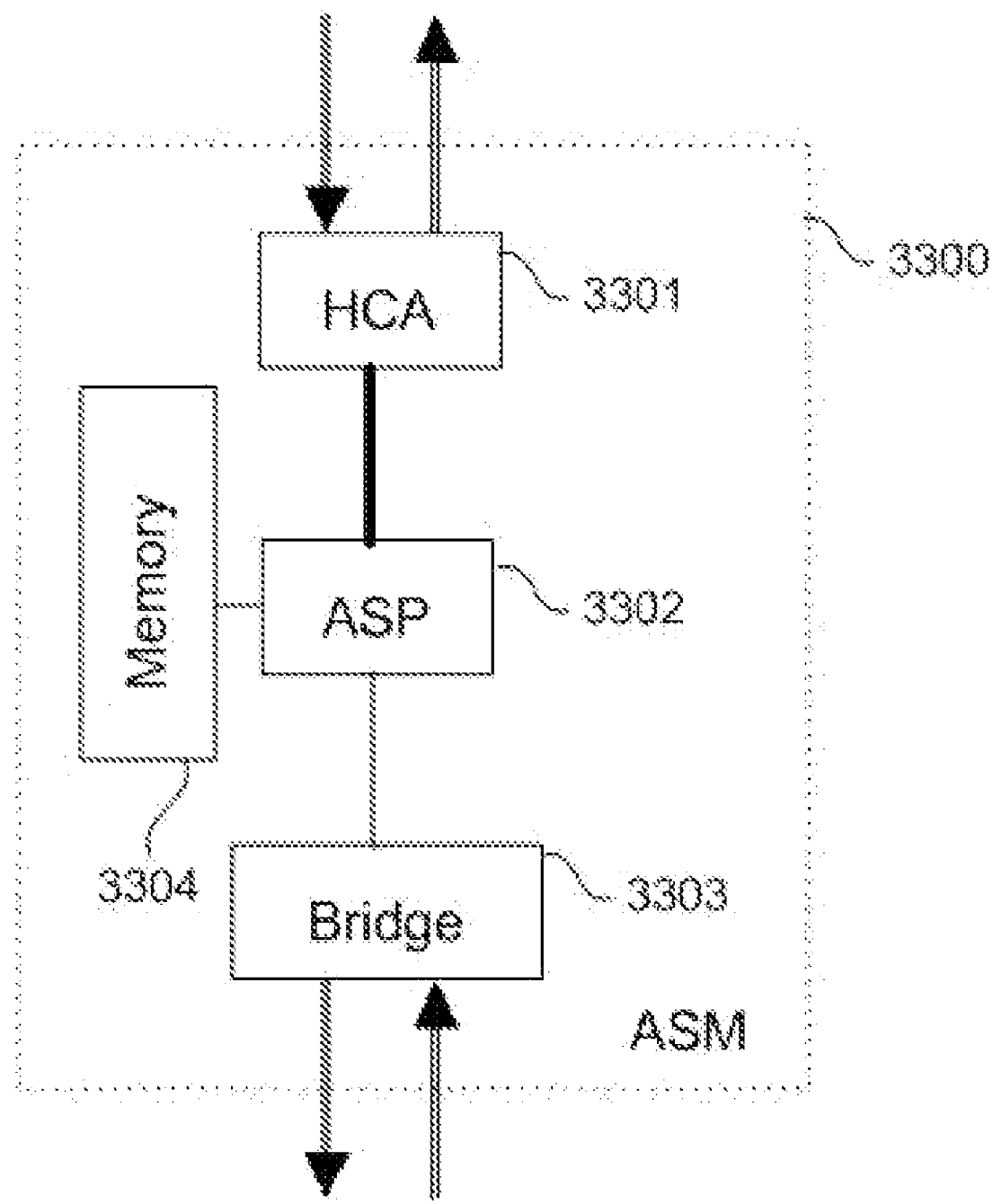
FIG. 12 is a block diagram of an Application Service Module (ASM) of an ANA according to one embodiment of the invention.

An ASM performs the ISO Layer-7 services, including application data processing on the data stream, which is the data stream of the transport protocol's PDU payload transformed by one or more NSMs. FIG. 12 illustrates how an ASM can be constructed in one embodiment of the invention. The ASM 3300 comprises a host channel adapter (HCA) 3301, an Application Service Processor (ASP) 3302, a bridge 3303 and memory 3304. The host channel adapter 3301 connects to the converged data center fabric which can be, for example, without limitation, LDTF or IB fabric. The bridge 3303 connects to the LDTF as a link to NSMs, for example. The ASP 3302 runs programs stored in memory 3304 to examine all ISO Layer-7 traffic and to perform ISO Layer-7 processing such as regular expression parsing, compression and decompression, standard and custom protocol proxy functions, etc.

Figure 13:
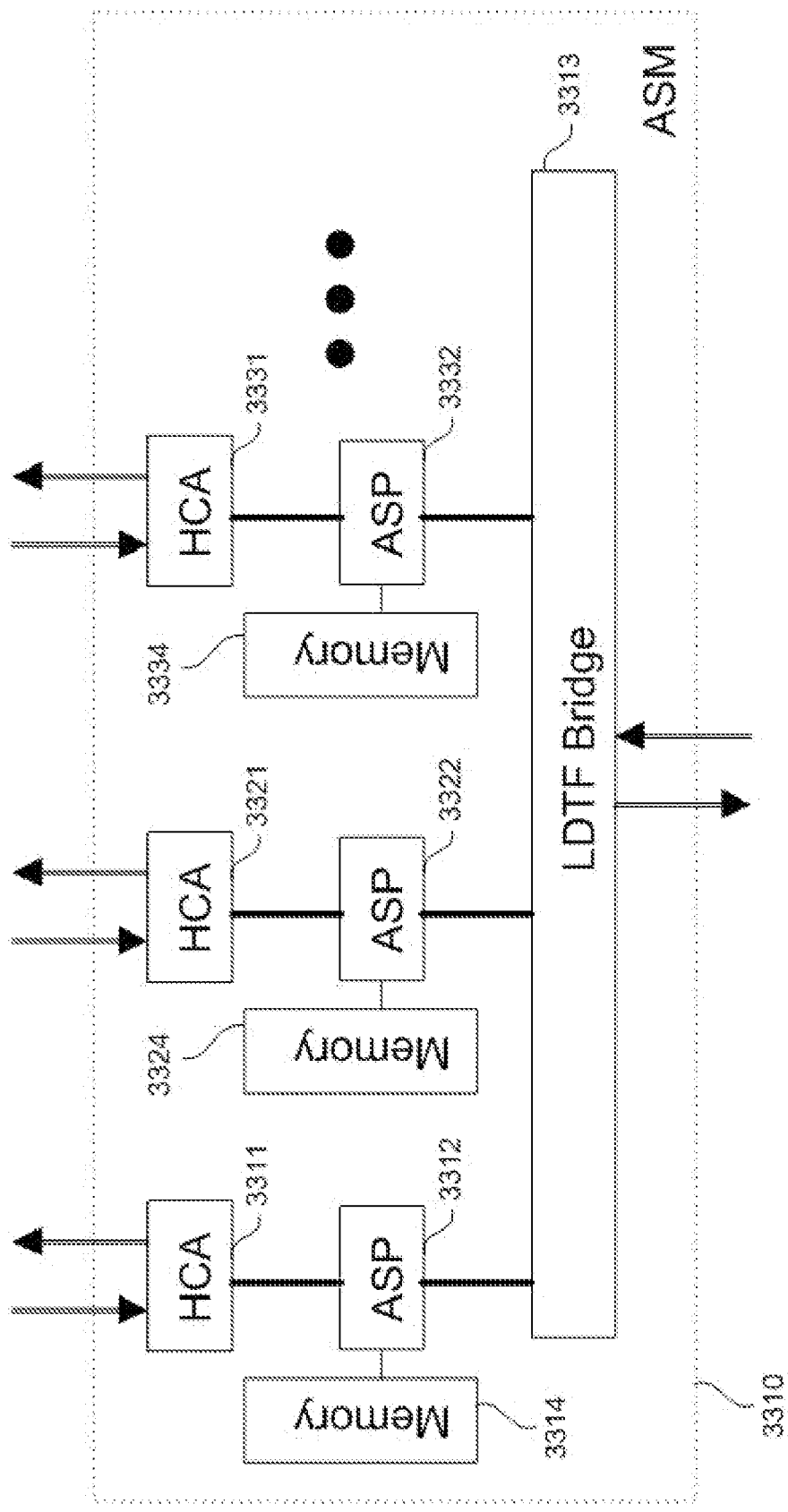
FIG. 13 is a block diagram of an ASM of an ANA according to another embodiment of the invention.

For those tasks a high compute power is needed, typically more than for plain ISO Layer-2 to ISO Layer-5 processing. Therefore, a single-processor architecture using existing micro-processors may require hardware assist to provide sufficient compute power for high-bandwidth client-to-server connections. Alternatively, it may be advantageous to implement an ASM either as a homogeneous multi-processor system of generic ISO Layer-7 processing units, or as a heterogeneous multi-processing system using a sea of different, specialized ISO Layer-7 processing units. FIG. 13 shows such a multi-processor architecture: Here the ASM 3310 can comprise two—or more—ASPs, such as ASP 3312, ASP 3322, ASP 3332, each having a dedicated host channel adapter, such as host channel adapter 3311, host channel adapter 3321, and host channel adapter 3331, and dedicated memory, such as memory 3314, memory 3324, and memory 3334. The LDTF bridge 3313 connects the ASPs via the LDTF to the NSMs, for example.

For building the multi-processor architecture of the ASM several options exist: A multi-core processor technology can be used, which can be a System-on-a-Chip with on-chip hardware accelerators; or one can use multi-core processors with external co-processors, for example, a co-processor for cryptographic operations, a co-processor for regular expression analysis, a co-processor for data compression and decompression, etc. A parallel-mode compute architecture can be deployed which will require a flow dispatcher to distribute incoming traffic across the multiple processors. A pipelined-mode compute architecture can be used, where one processing element acts as a pre-processor for a subsequent processing element. Or, a hybrid approach can be used combining parallel mode with pipelined compute architectures. Further, any other architecture contemplated by one of skill in the art may be used.

LDTF to Connect L2-L5 Unit with L7 Units

Figure 14:
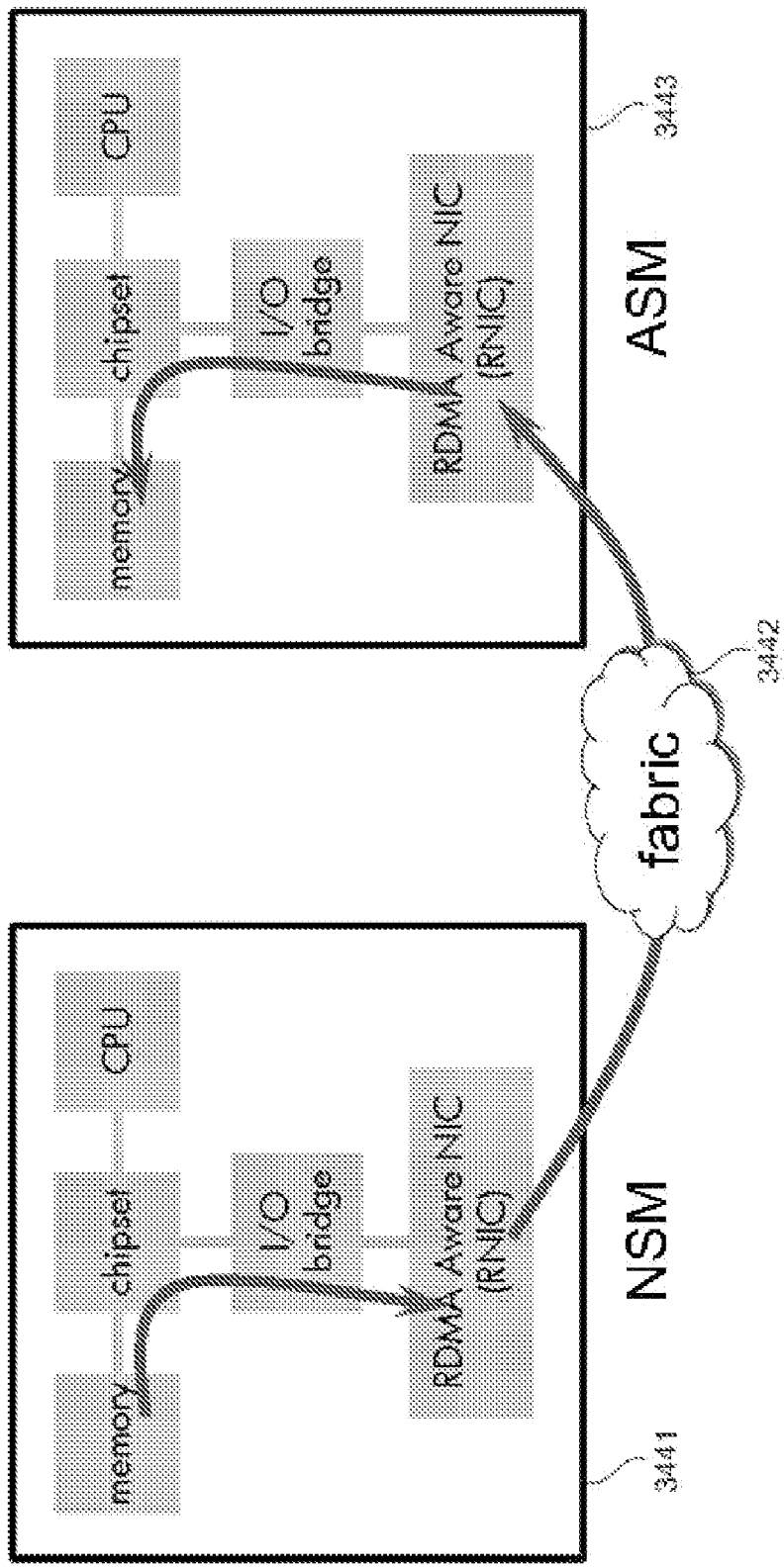
FIG. 14 is a block diagram which illustrates LDTF connectivity between a NSM and an ASM of an ANA according to one embodiment of the invention.

In any case, the compute architecture requires a lossless, low-latency, high-bandwidth fabric for any-to-any inter-process communication links between the one or more NSMs (which each may comprise one or more NSPs) and the one or more ASMs (which each may comprise one or more ASPs). FIG. 14 shows how in one embodiment of the invention, one ISO Layer-2 to ISO Layer-5 processing unit, NSM 3441, and one ISO Layer-7 processing unit, ASM 3443, can be connected via the LDTF 3442. Key to the connection is the use of an RDMA network interface connector (RNIC) which can be a host channel adapter for IB, for example, host channel adapter 2801, or host channel adapter 2811, or host channel adapter 2821, or host channel adapter 2831, or host channel adapter 3301, or host channel adapter 3311, or host channel adapter 3321, or host channel adapter 3331. Of course, two or more ISO Layer-2 to ISO Layer-5 processing units can be connected to two or more ISO Layer-7 processing units accordingly.

Many options exist for implementing the LDTF 3442: In one embodiment of the invention the LDTF can be IB. In another embodiment of the invention the LDTF can be Data Center Ethernet with RDMA support. In yet another embodiment of the invention, the LDTF can be iWARP which supports RDMA over TCP. Besides being a lossless, low-latency, high-bandwidth interconnect means RDMA enables the performance of RDMA one-sided read-based load monitoring and can be used to map connection level flow control using RDMA queue-pair flow control.

Stream Switch Architecture Based on LDTF

One fundamental, novel principle of this approach is to split the processing architecture into separate planes: A Management Service plane, a Network Service plane and an Application Service plane. The Management Service plane comprises one or more SCMs and is used for all out-of-band connectivity to processing elements on the Network Service plane and to processing elements on the Application Service plane and can be used, for example, for software image downloading, command-line interface, statistic collection messages, general system management functions, configuration management, etc. The Network Service plane comprises one or more NSMs for ISO Layer-2 to ISO Layer-5 processing and proxy functions. The Application Service plane comprises one or more ASMs for ISO Layer-7 services processing and for data stream analysis. As discussed above, this division into a Network Service plane and Application Service plane should be viewed as exemplary only, and other divisions and arrangements and number of service planes may be contemplated by one of skill in the art.

This tri-planar architecture is, for example, shown in FIG. 8, where ASM 2301 performs the processing for the Application Services, NSM 2303 performs the processing for the Network Services and SCM 2305 performs the processing for the Management Service plane. The lossless, low-latency, high-bandwidth LDTF 2302 connects these processing planes for efficient, reliable and scalable inter-process communication. While FIG. 8 explains the tri-planar architecture for the case of converged data center fabric connections to application servers, this tri-planar architecture can easily be adjusted to function with standard Ethernet for application server connections.

Processing Flows

Splitting the data network processing into two separate domains, Network Service processing and Application Service processing—especially when constrained by scalability and high-availability—may require a particular processing flow between the one or more NSPs and the one or more ASPs.

For example, it is desirable to enforce flow-control because the proxy splits the client-server connection into two portions: One client-to-proxy connection which typically has a high round-trip delay time and low throughput and a proxy-to-server connection which typically has low round-trip delay time and high throughput. The flow control for the client connection and the server connection mimic the behavior of the end-to-end flow-control of the original client-to-server connection. The internal LDTF enables the mapping of connection-level flow-control using RDMA queue-pair flow-control and therefore solves the problem created by splitting the client-server connection with a proxy.

Figure 15:
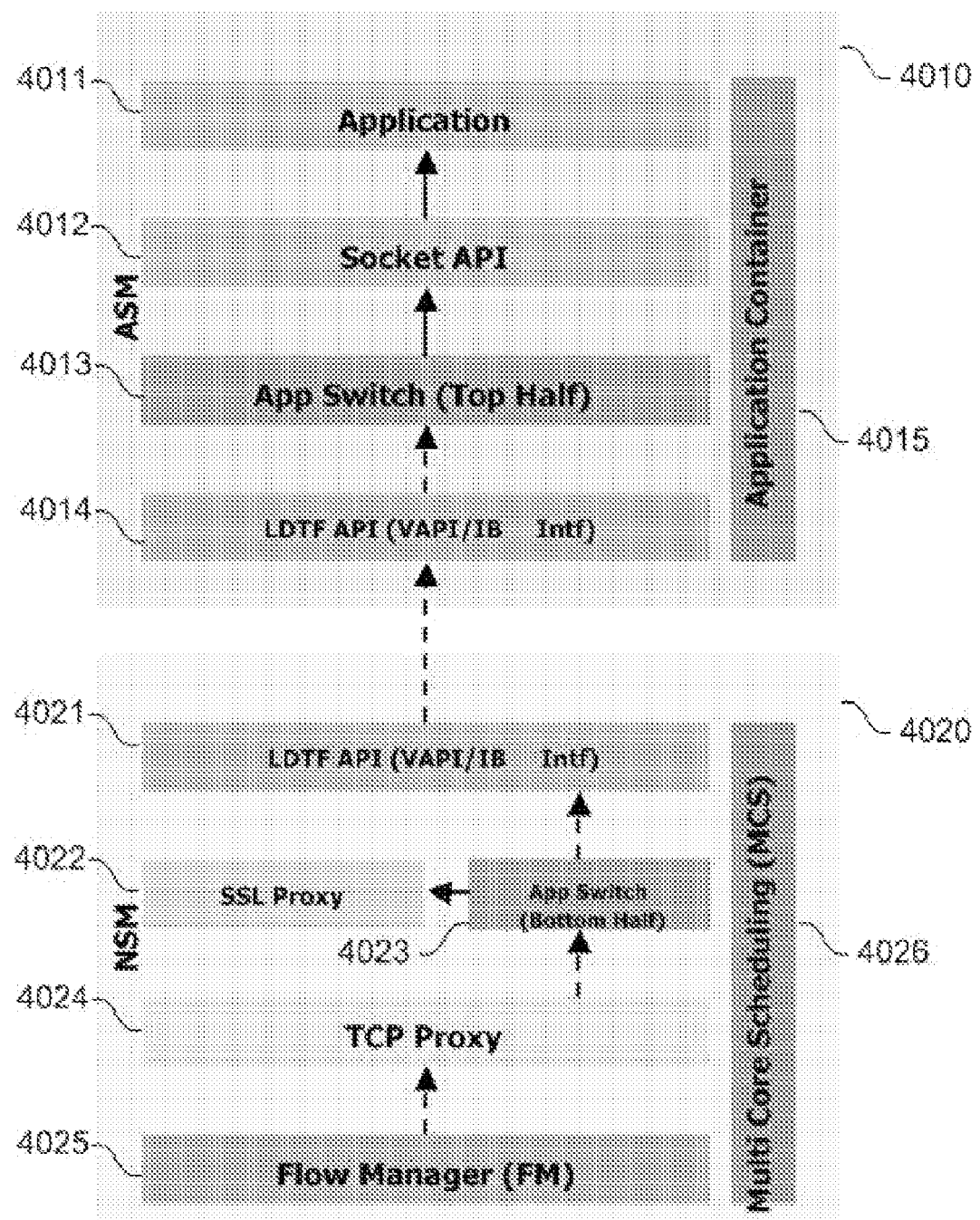
FIG. 15 is a block diagram which illustrates inter-process communication between a NSP and an ASP in an ANA according to one embodiment of the invention.

FIG. 15 shows a processing flow in accordance to one embodiment of the invention. The network processing is split between the Network Service processing 4020 and the Application Service processing 4010. The Network Service processing 4020 can, for example, be done by NSM 2800 of FIG. 10. The Application Service processing 4010 can, for example, be done by NSM 3300 of FIG. 12. The Network Service processing 4020 comprises Flow Manager 4025, TCP Proxy 4024, SSL Proxy 4022, Application Switch 4023, Channel API 4012, and Multi-Core Scheduling 4026. The Flow Manager 4025 performs network load balancing on ingress and egress network connections. The TCP Proxy 4024 does TCP termination and acts as an ISO Layer-2 to ISO Layer-4 proxy between client and server. The Application Switch 4023 transforms (among other processing) the PDU payload into a data stream. In case the network data is SSL encrypted, the data stream is forwarded to SSL Proxy 4022. Then the data stream is sent to the Channel API 4021 which sends the data stream data via the LDTF to the ASM's Channel API 4014. The Multi-Core Scheduling 4026 performs load balancing of the network processing among two or more NSPs. The Application Service processing 4010 comprises the Channel API 4014, the Application Switch 4013, the Socket API 4012, the Application processing 4011, and the Application Container 4015. The Channel API 4014 receives the data stream data from the NSM's Channel API 4021 and forwards it to the Application Switch 4013, which performs ISO Layer-7 processing on the data stream data such as Tri-angulated Authorization, etc. To submit the data stream data to the Application 4011, the Socket API 4012 is used. The Application 4011 can, for example, be applications 2005 from FIG. 2. The Application Container 4015 performs load balancing on the two or more ASPs such that the data stream information is either processed in a parallel fashion, in a pipelined fashion, or in a hybrid fashion.

Based on the granularity of the processing steps that can be distributed among the two or more NSPs, or the two or more ASPs, several options exist for load balancing, for example, in the Multi-Core Scheduling 4026 or in the Application Container 4015. In order to handle the events for multiple sockets, a typical application will map each socket to a thread or a process. The advantage with this approach is that the scheduling for different socket events is taken care of by the operating system. But the disadvantage is that process and thread scheduling is a very costly operation. Especially for high-speed network applications, which handle many connections, considerable CPU resources will be used just for process and thread scheduling. A library of ultra-light-weight strands can solve this problem by providing a light-weight execution context (the so-called strand) and by mapping a socket to each strand. The strand library enables having multiple strands within a system scheduling context of either processes or threads. Strand scheduling can be performed by a secondary scheduler. Essentially the operating system schedules the processes and threads, and the strand library schedules the strands. The strand scheduler can be completely I/O driven; i.e., a strand is scheduled whenever there is an incoming or outgoing event for a given socket. In order to provide an independent execution context for each strand, a separate stack can be allocated for each strand.

Scalability

Various embodiments of some of the inventions for scalability have been described in this disclosure, for example, the embodiment of the invention can not only be used for high-availability but also to scale an ANA for higher bandwidth and network processing demands. When two or more NSMs or two or more ASMs are connected via LDTF within one ANA, the inter-process communication between NSMs and ASMs then operates via so-called intra-chassis communication. Alternatively, when two or more ANAs are connected via LDTF, the inter-process communication then operates via so-called inter-chassis communication. Or, when both approaches are combined, both intra-chassis and inter-chassis communication goes over the LDTF.

Figure 16:
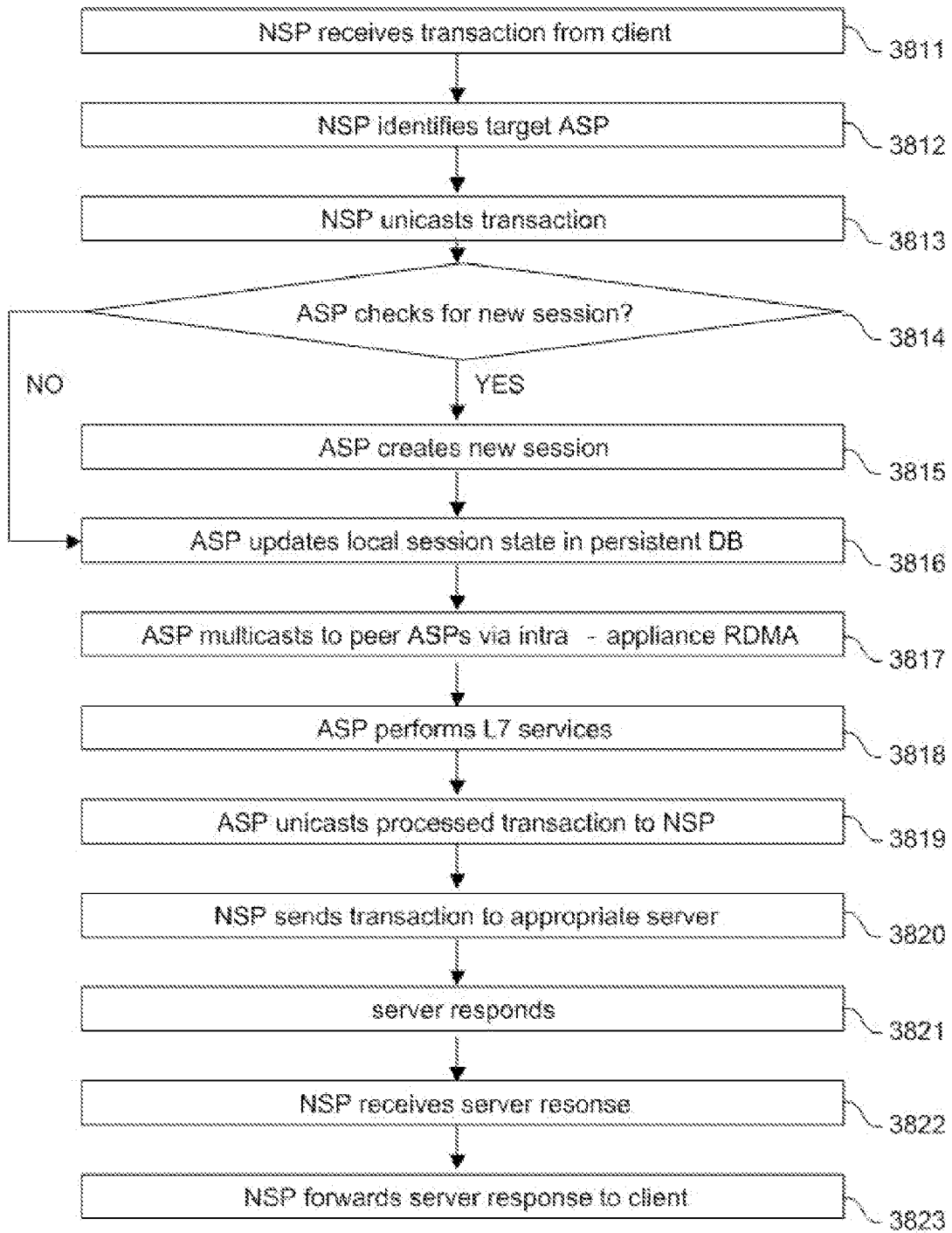
FIG. 16 is a flow diagram of inter-process communication in an ANA according to one embodiment of the invention.

FIG. 16 shows a method for intra-chassis communication between one or more NSMs and one or more ASMs when an application server is connected via classical Ethernet. In step 3811 an NSP receives a transaction from a client. In step 3812 the NSP identifies the target ASP. In step 3813 the NSP uni-casts the transaction to the ASP identified in step 3812. In step 3814 the ASP checks whether this transaction is part of a new session. If the result of this check is positive (YES), the ASP creates a new session in step 3815 and proceeds to step 3816. Otherwise (NO), the method proceeds to step 3816 immediately. In step 3816 the ASP updates the local session state in the persistent database. In step 3817 the ASP multi-casts the database information for the updated local session state to the peer ASPs via an intra-chassis RDMA operation. This step is part of achieving high-availability with zero-click fail-over. In step 3818 the ASP performs the ISO Layer-7 services, for example, based on policies. In step 3819 the ASP uni-casts the transaction, which is now processed, back to the NSP. In step 3820 the NSP sends the ISO Layer-7 processed transaction to the appropriate application server. In step 3821 the application server responds and in step 3822 the NSP receives the application server's response. In the last step 3823, the NSP then forwards the application server's response back to the client.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A network apparatus, comprising:
    a plurality of application service modules (ASMs) comprising an application service processor, wherein each of the plurality of ASMs is capable of providing one or more application services to network traffic, including an ISO layer 7 service;
    a remote direct memory access (RDMA) lossless data transport fabric (LDTF) configured to transmit a data stream; and
    a plurality of network service modules (NSMs) comprising a network service processor coupled to the ASMs over the LDTF, wherein the NSMs are configured to:
        perform all of ISO layer 2 to layer 5 (layer 2-5) processes on one of a plurality of packets of a network transaction received from a client over a first network for accessing a server of a data center over a second network;
        terminate transport protocol processing of the packets;
        generate a data stream of the packets; and
        route the data stream to the ASMs over the LDTF to allow the ASMs to perform all of ISO layer 5 to layer 7 (layer 5-7) processes on the packets;
    wherein the NSMs are further configured to terminate a transport control protocol (TCP) connection associated with the network transaction and to route the data stream to the plurality of ASMs and to transform the data stream of the layer 5-7 processed packets received from the ASMs into protocol data units (PDUs); and
    wherein the ASMs are further configured to route the data stream of layer 5-7 processed packets to the NSMs after the ASMs perform the layer 5-7 processes on the packets without having to terminate the TCP connection again.

2. The network apparatus of claim 1, wherein the ASMs include a first ASM and a second ASM, and wherein the first ASM performs a first portion of the layer 5-7 processes and the second ASM performs a second portion of the layer 5-7 processes.

3. The network apparatus of claim 2, wherein the first and second ASMs are configured to perform the layer 5-7 processes in parallel.

4. The network apparatus of claim 2, wherein the first ASM includes a first memory to store a first set of layer 5-7 states associated with the first portion of the layer 5-7 processes performed by the first ASM, wherein the second ASM includes a second memory to store a second set of layer 5-7 states associated with the second portion of the layer 5-7 processes performed by the second ASM, and wherein the first set and second set of layer 5-7 states are synchronized periodically or constantly.

5. The network apparatus of claim 4, wherein the first set and second set of layer 5-7 states are synchronized via the RDMA link over the LDTF.

6. The network apparatus of claim 2, wherein the NSMs are configured to determine a load status of each of the plurality of ASMs and to dispatch the data stream to the first and second ASMs based on at least one load status of the first and second ASMs and packet information including ISO layer-3 header information.

7. The network apparatus of claim 6, wherein the NSMs are configured to monitor the load status of each ASM by polling a memory location of each ASM which stores the load status of one or more processors or processing cores of the ASM.

8. The network apparatus of claim 7, wherein load balancers of the NSMs perform a one-way read from the memory location of each ASM via the (RDMA) channel over the LDTF without using significant processing power of the ASM.

9. The network apparatus of claim 8, wherein the LDTF is an InfiniBand compatible fabric.

10. The network apparatus of claim 1, wherein the network apparatus is configured to operate as an application services gateway to the data center with respect to a plurality of clients when at least one client accesses at least one of a plurality of servers of the data center.

11. The network apparatus of claim 1, wherein the plurality of ASMs are configured to perform the layer 5-7 processes in a pipelined manner.

12. The network apparatus of claim 11 wherein the plurality of ASMs are configured to perform layer 5-7 processes in an out-of-order pipelined manner.

13. The network apparatus of claim 1, wherein the plurality of ASMs are configured to perform the layer 5-7 processes in a hybrid combination of a parallel and a pipelined manner.

14. A method comprising:
   receiving at a network element one or more packets of a network transaction from a client over a first network for accessing a plurality of servers of a data center over a second network;
   operating the network element as an application services gateway of the data center with respect to a plurality of clients accessing at least one of the servers;
   at one of a plurality of network service modules (NSMs) comprising a network service processor:
      performing all of ISO layer 2 to layer 5 (layer 2-5) processes on the packets;
      terminating a transport control protocol (TCP) connection processing of the packets incoming from the client;
      generating a data stream of the packets;
      routing the data stream over a lossless data transport fabric (LDTF) from the NSMs to first and second application service modules (ASMs) comprising an application service processor coupled to the NSMs by the LDTF to perform ISO layer 5 to layer 7 (layer 5-7) processes without having to terminate the TCP connection again;
      routing the data stream of layer 5-7 processed packets over the LDTF from the ASMs back to the NSMs; and
   at the NSMs, transforming the data stream of layer 5-7 processed packets received from the ASMs into protocol data units (PDUs).

15. The method of claim 14, wherein performing further comprises performing layer 5-7 processes by a first ASM performing a first portion of the layer 5-7 processes and a second ASM performing a second portion of the layer 5-7 processes.

16. The method of claim 15, further comprising storing in a first memory a first set of layer 5-7 states associated with the first portion of the layer 5-7 processes performed by the first ASM, storing in a second memory a second set of layer 5-7 states associated with the second portion of the layer 5-7 processes performed by the second ASM, and synchronizing the layer 5-7 states of the first and second memories periodically or constantly via a remote direct memory access (RDMA) link over the LDTF.

17. The method of claim 15, further comprising:
   at the NSMs, determining a load status of each of the plurality of ASMs; and
   at the NSMs, dispatching the data stream to the first and second ASMs based on at least one load status of the first and second ASMs and packet information including layer-3 header information.

18. The method of claim 17, further comprising at the NSMs, monitoring the load status of each ASM by polling a memory location of each ASM which stores the load status of one or more processors or processing cores of the ASM.

19. The method of claim 18, further comprising at the NSMs, performing a one-way read from the memory location of each ASM via a remote direct memory access (RDMA) channel over the LDTF without having to invoke significant processing power of each ASM.

20. A machine-readable storage device storing instructions that, when executed by a processor, cause the processor to:
   receive at a network element one or more packets of a network transaction from a client over a first network for accessing a plurality of servers of a data center over a second network;
   operate the network element as an application services gateway of the data center with respect to a plurality of clients accessing at least one of the servers;
   at one of a plurality of network service modules (NSMs):
      perform all of ISO layer 2 to layer 5 (layer 2-5) processes on the packets;
      terminate transport protocol processing of the packet incoming from the client;
      generate a data stream of the packets;
      routing the data stream over a lossless data transport fabric (LDTF) from the NSMs to first and second application service modules (ASMs) coupled to the NSMs by the LDTF to perform ISO layer 5 to layer 7 (layer 5-7) processes without having to terminate the TCP connection again;
   route the data streams of layer 5-7 processed packets over the LDTF from the ASMs back to the NSMs; and
   transform the data stream of layer 5-7 processed packets received from the ASMs into protocol data units (PDUs) at the NSMs.

21. The machine-readable storage device of claim 20 further comprising instructions that cause the processor to perform a first portion of the layer 5-7 processes at a first ASM and a second portion of the layer 5-7 processes at a second ASM.

22. The machine-readable storage device of claim 21, further comprising instructions that cause the processor to store in a first memory a first set of layer 5-7 states associated with the first portion of the layer 5-7 processes performed by the first ASM, to store in a second memory a second set of layer 5-7 states associated with the second portion of the layer 5-7 processes performed by the second ASM, and to synchronize the layer 5-7 states of the first and second memories periodically or constantly via a remote direct memory access (RDMA) link over the LDTF.

23. The machine-readable storage device of claim 21, further comprising instructions that cause the processor to determine a load status of each of the plurality of ASMs; and dispatch the data stream to the first and second ASMs based on at least one load status of the first and second ASMs and packet information including layer-3 header information.

24. The machine-readable storage device of claim 23, further comprising instructions that cause the processor to monitor the load status of each ASM by polling a memory location of each ASM which stores the load status of one or more processors or processing cores of the ASM.

25. The machine-readable storage device of claim 24, further comprising instructions that cause the processor to perform a one-way read from the memory location of each ASM via an RDMA channel over the LDTF without having to invoke significant processing power of the ASM.

* * * * *